United States Patent
Iwase et al.

(10) Patent No.: US 12,182,475 B2
(45) Date of Patent: Dec. 31, 2024

(54) INFORMATION PROCESSING APPARATUS AND COMMAND PROCESSING METHOD

(71) Applicant: Sony Group Corporation, Tokyo (JP)

(72) Inventors: Hiro Iwase, Tokyo (JP); Yuhei Taki, Tokyo (JP); Kunihito Sawai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/771,043

(22) PCT Filed: Oct. 20, 2020

(86) PCT No.: PCT/JP2020/039401
§ 371 (c)(1),
(2) Date: Apr. 22, 2022

(87) PCT Pub. No.: WO2021/085242
PCT Pub. Date: May 6, 2021

(65) Prior Publication Data
US 2022/0357915 A1    Nov. 10, 2022

(30) Foreign Application Priority Data

Oct. 30, 2019    (JP) ................. 2019-197969

(51) Int. Cl.
*G06F 3/16*    (2006.01)
*G06F 3/01*    (2006.01)
*G10L 15/22*    (2006.01)

(52) U.S. Cl.
CPC .............. *G06F 3/167* (2013.01); *G06F 3/012* (2013.01); *G10L 15/22* (2013.01); *G10L 2015/223* (2013.01)

(58) Field of Classification Search
CPC ........ G06F 3/167; G06F 3/012; G06F 3/0482; G06F 3/165; G06F 2203/0381;
(Continued)

(56) References Cited

U.S. PATENT DOCUMENTS

2012/0114127 A1* 5/2012 Yamashita ........... H03G 3/3005
381/56
2013/0311916 A1* 11/2013 Weng ................. G01C 21/3664
715/764
(Continued)

FOREIGN PATENT DOCUMENTS

JP    2000-112490 A    4/2000
JP    2016-109726 A    6/2016
(Continued)

OTHER PUBLICATIONS

International Search Report and Written Opinion mailed on Dec. 28, 2020, received for PCT Application PCT/JP2020/039401, Filed on Oct. 20, 2020, 11 pages including English Translation.

*Primary Examiner* — Phuong H Nguyen
(74) *Attorney, Agent, or Firm* — XSENSUS LLP

(57) ABSTRACT

A detection unit (30) detects an input start timing of a command by a gesture on an operation target with a temporal change. A command processing unit (31) performs processing of a command recognized from the gesture based on the state of the operation target at the input start timing detected by the detection unit (30).

19 Claims, 17 Drawing Sheets

(58) Field of Classification Search
CPC ..... G06F 3/017; G06F 3/04847; G10L 15/22; G10L 2015/223
See application file for complete search history.

(56) References Cited

U.S. PATENT DOCUMENTS

| | | | |
|---|---|---|---|
| 2018/0113674 A1* | 4/2018 | Jin | G06F 3/167 |
| 2018/0130462 A1* | 5/2018 | Kayama | G10L 13/00 |
| 2019/0198044 A1* | 6/2019 | Shimada | G06F 18/00 |

FOREIGN PATENT DOCUMENTS

| | | | |
|---|---|---|---|
| JP | 2016109726 | * | 6/2016 |
| JP | 2016-218852 A | | 12/2016 |
| WO | 2004/104986 A1 | | 12/2004 |
| WO | WO 2004104986 | * | 12/2004 |
| WO | 2018/034077 A1 | | 2/2018 |
| WO | WO 2018034077 | * | 2/2018 |

* cited by examiner

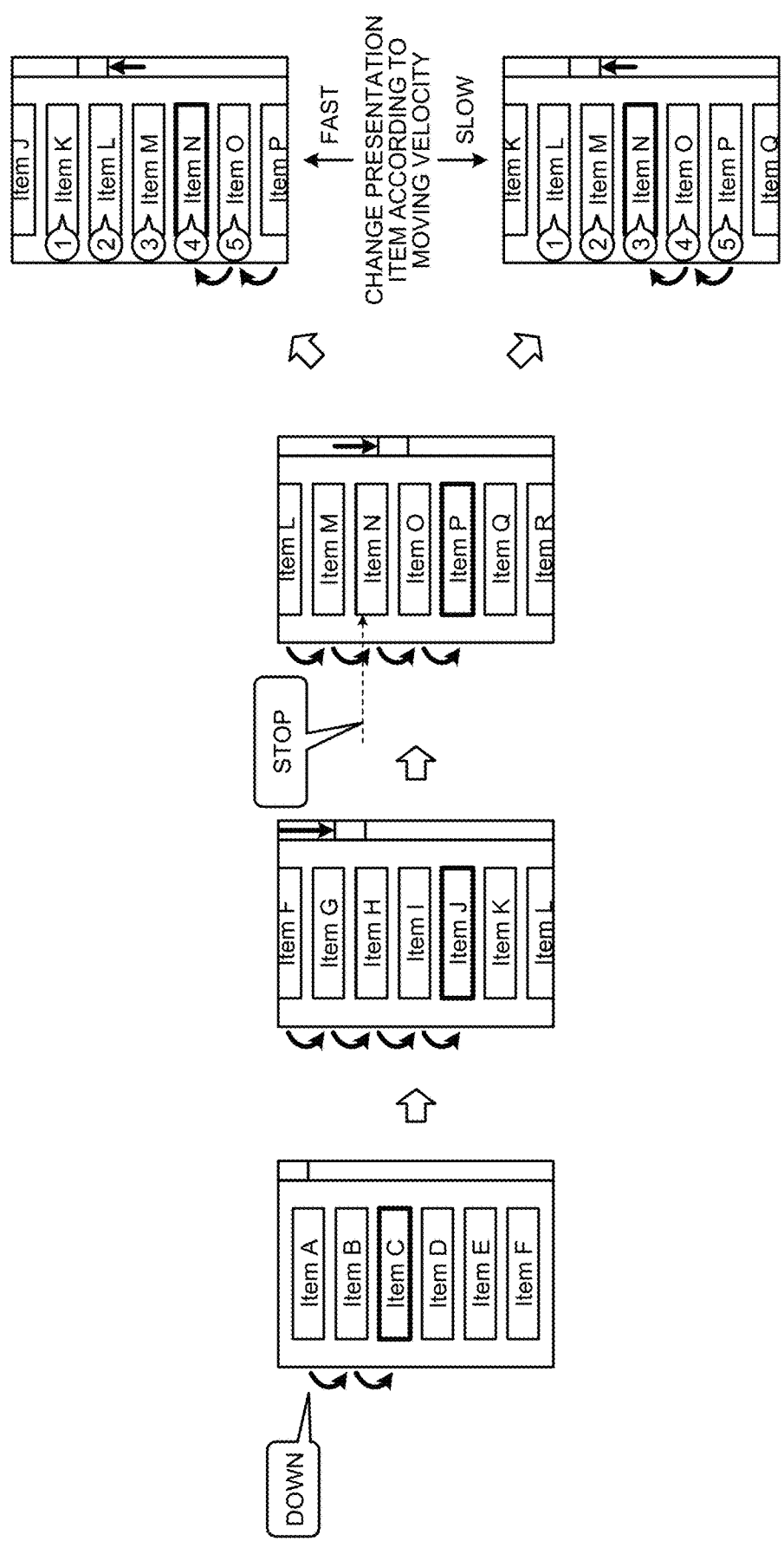

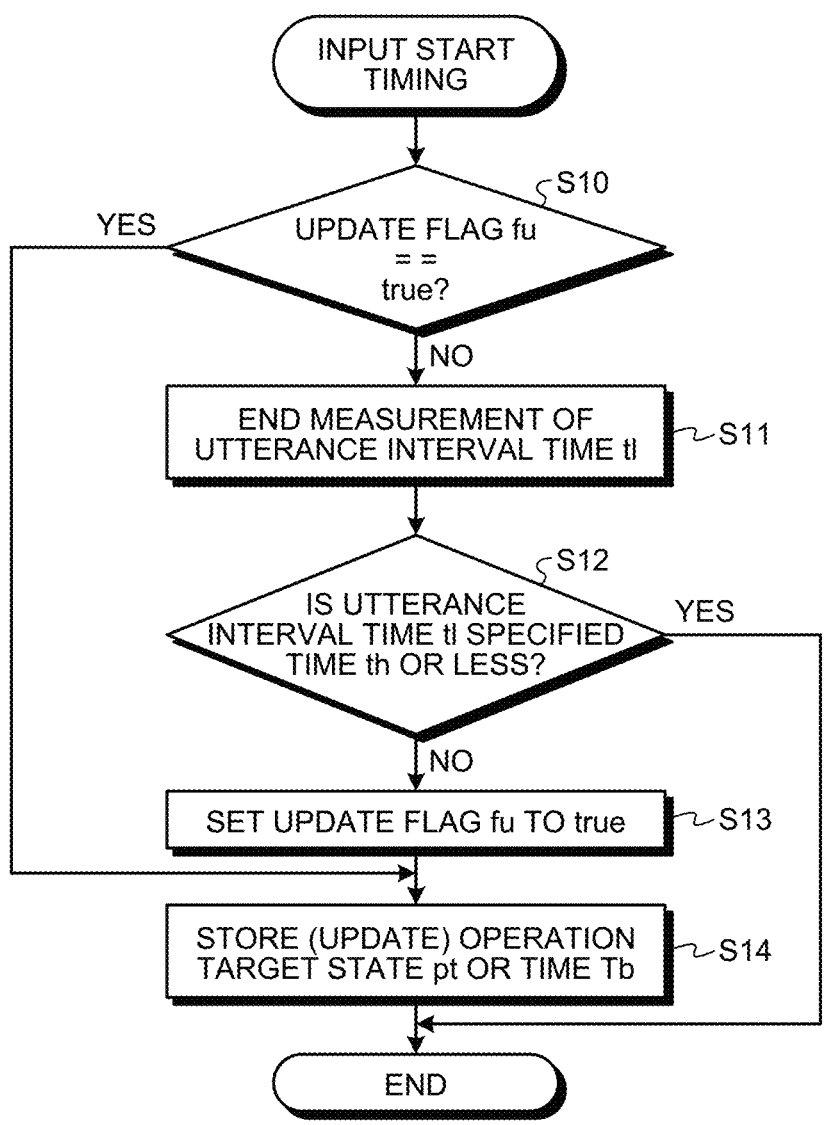

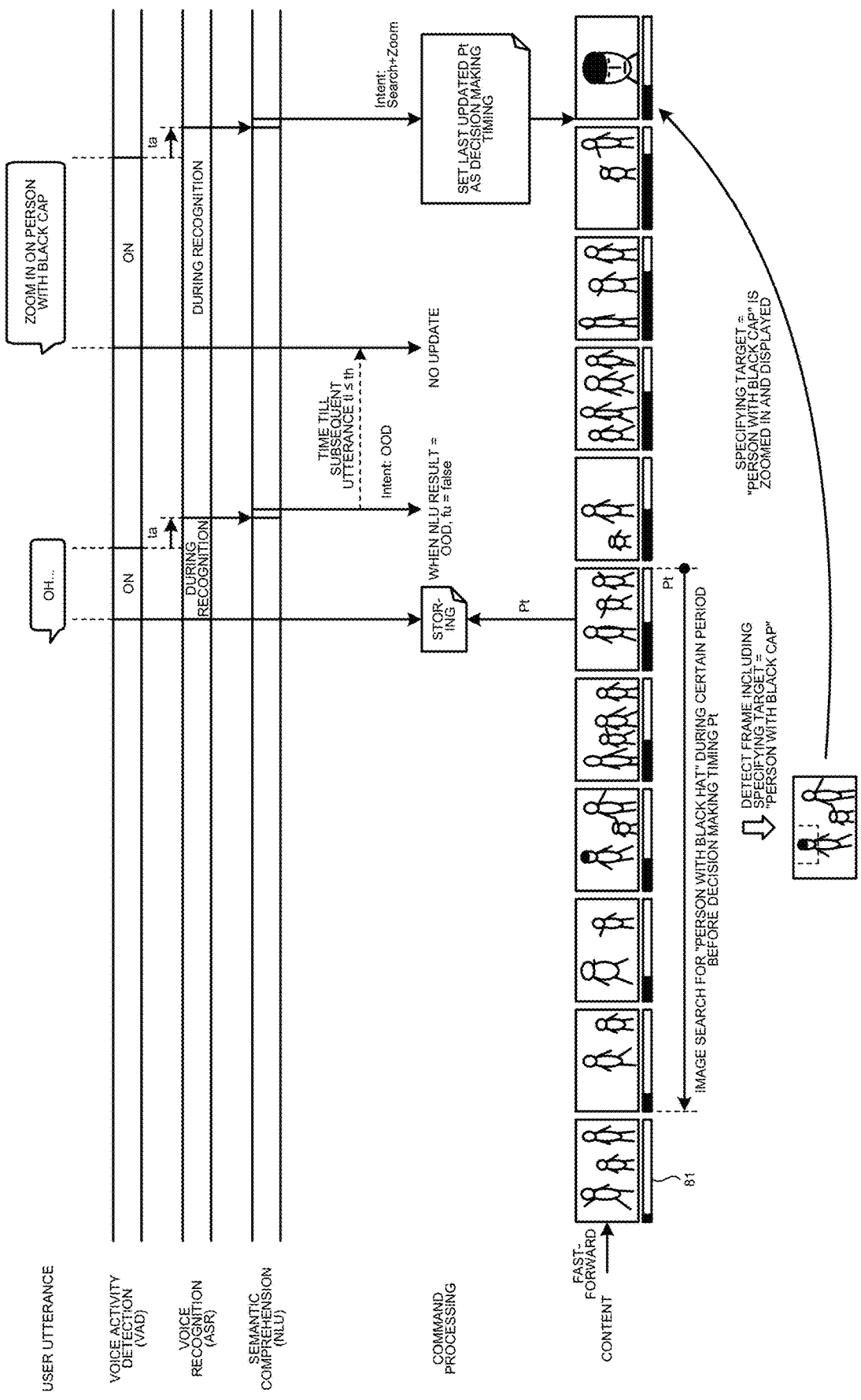

INFORMATION PROCESSING APPARATUS AND COMMAND PROCESSING METHOD

CROSS-REFERENCE TO RELATED APPLICATIONS

The present application is based on PCT filing PCT/JP2020/039401, filed Oct. 20, 2020, which claims priority to Japanese Patent Application No. 2019-197969, filed Oct. 30, 2019, the entire contents of each are incorporated herein by reference.

FIELD

The present invention relates to an information processing apparatus and a command processing method.

BACKGROUND

There is known a technique of receiving an input of a command by voice, recognizing the received voice, and executing processing corresponding to a result of the recognition. For example, Patent Literature 1 proposes a technique in which only a start portion of a received voice is set as a recognition target, and processing corresponding to the recognition result is started at a point where the start portion is recognized.

CITATION LIST

Patent Literature

Patent Literature 1: JP 2000-112490 A

SUMMARY

Technical Problem

However, the technique described in Patent Literature 1 starts processing corresponding to the recognition result after voice is recognized, and thus, there is a case where a delay occurs in the start of the processing by an amount corresponding to the recognition processing, leading to a failure in performing processing of the command at an intended timing.

In view of this, the present disclosure proposes an information processing apparatus and a command processing method capable of performing processing of the command on an operation target at an intended timing.

Solution to Problem

According to the present disclosure, an information processing apparatus includes a detection unit and a command processing unit. The detection unit detects an input start timing of a command by a gesture on an operation target with a temporal change. The command processing unit performs processing of a command recognized from the gesture based on a state of the operation target at the input start timing detected by the detection unit.

BRIEF DESCRIPTION OF DRAWINGS

FIG. 10 is a diagram illustrating an example of operation using voice on an operation target with a temporal change according to the embodiment of the present disclosure.

FIG. 11 is a flowchart describing state storage processing according to the embodiment of the present disclosure.

FIG. 13 is a diagram describing a modification of the present disclosure.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

The present disclosure will be described in the following order.
1-1. Introduction
1-2. Outline of embodiment
2-1. Configuration of information processing system according to embodiment
2-2. Specific examples 2-3. Flow of processing according to embodiment
3. Modification
4. Effects of embodiment

1-1. Introduction

There has been a known technique of inputting a command using a gesture. The following will describe a case where voice is used as a gesture and a command input is performed by voice as an example, but a command input method is not limited to this case. The technique of the present disclosure may be applied in a case where the gesture is a physical motion such as body or hand gesture and the command input is performed by such a physical motion.

For example, in a case where an operation target with a temporal change is operated by a command by voice, a user inputs the command by voice at a timing of making an operation decision. However, there is a case where an occurrence of delay (latency) in the execution of the command by the amount of the utterance or the voice recognition processing changes the state of the operation target, leading to a failure in performing the operation as intended by the user.

Figure 1:
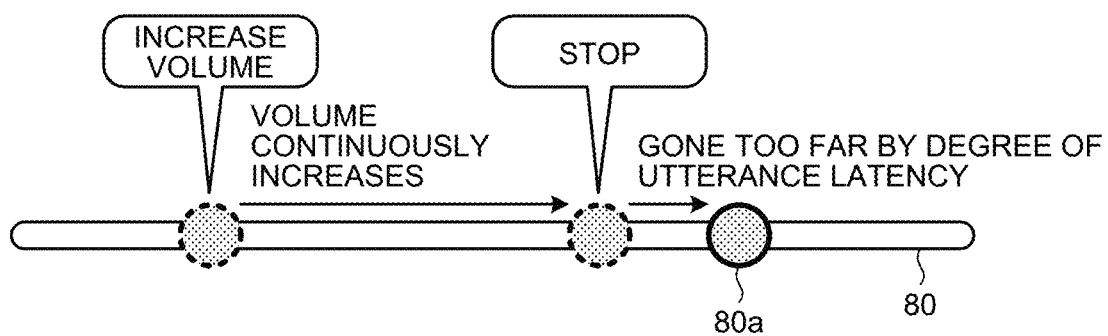
FIG. 1 is a diagram illustrating an example of a conventional operation using voice on an operation target with a temporal change.

FIG. 1 is a diagram illustrating an example of a conventional operation using voice on an operation target with a temporal change. FIG. 1 illustrates a volume indicator 80 for adjusting the volume, the volume indicator 80 being provided as an operation target with a temporal change. The volume indicator 80 is provided with a slider bar 80a indicating the volume. Operation of the volume can be made on the volume indicator 80 by moving the slider bar 80a. Furthermore, on the volume indicator 80, the slider bar 80a moves with the operation of the volume by voice. FIG. 1 illustrates a case where a system receives a command by voice and sets the volume on the volume indicator 80. The system continuously increases the volume in response to the voice "increase the volume" and stops the increase in the volume in response to the voice "stop". In a case of increasing the volume, the user utters "increase the volume", and then starts utterance of "stop" at a time point where the user hears the target volume while listening to the increasing volume. However, the system performs voice recognition/semantic comprehension processing after the end of the utterance of "stop", and thereafter stops increasing the volume. With this processing, the volume is increased excessively to a volume increased by the degree of latency (overshoot) as compared with the volume at the start of utterance of "stop" that the user intended to set. In the command operation using voice recognition, the system cannot determine processing to execute until the user finishes uttering the command and the system has interpreted the text that has undergone voice recognition as a command. This causes the system to have a latency from the start of utterance by the user to the execution of processing of the command by the system. As a result, the processing of the command cannot be performed at the timing intended by the user.

1-2. Outline of Embodiment

To handle this issue, the present embodiment detects an input start timing of the command by the gesture on the operation target with the temporal change, and performs the processing of the command recognized from the gesture based on a state of the operation target at the detected input start timing. This makes it possible to perform the processing of the command on the operation target at the timing intended by the user.

Following the outline of the present embodiment described above, details of the present embodiment will be described below.

2-1. Configuration of Information Processing System According to Embodiment

Figure 2:
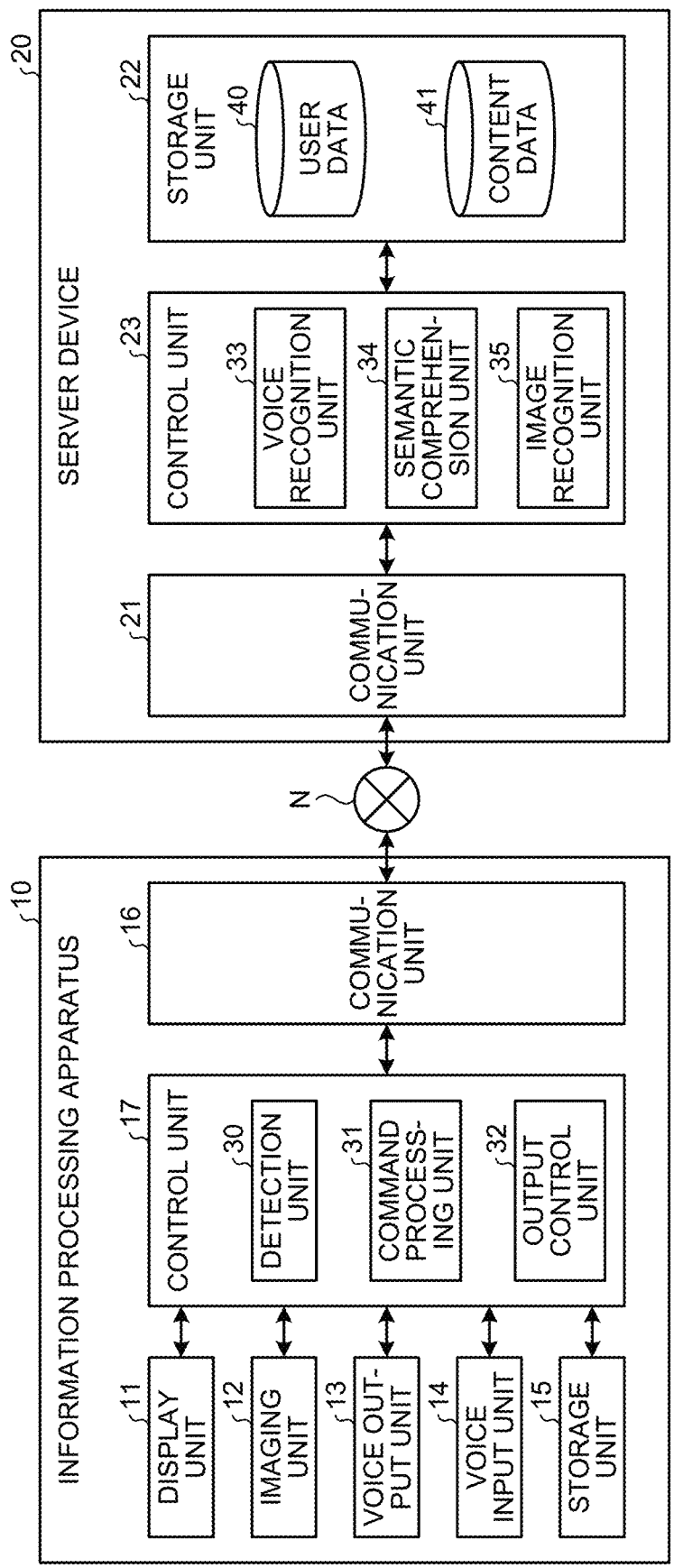
FIG. 2 is a diagram illustrating a configuration example of an information processing system according to an embodiment of the present disclosure.

A configuration of an information processing system 1 including an information processing apparatus 10, which is an example of an information processing apparatus that executes information processing according to the embodiment, and a server device 20, will be described with reference to FIG. 2. FIG. 2 is a diagram illustrating a configuration example of the information processing system 1 according to the embodiment of the present disclosure. The information processing system 1 is a system that provides a command input by a gesture.

The information processing apparatus 10 is an information processing terminal that receives a command input using a gesture from the user on an operation target with a temporal change. In the present embodiment, the information processing apparatus 10 receives an input of a command by voice from the user. The information processing apparatus 10 may be a personal computer, or a mobile terminal such as a smartphone or a tablet terminal carried by the user. In the present embodiment, the information processing apparatus 10 corresponds to the information processing apparatus according to the present disclosure.

The server device 20 is a server device that performs recognition processing on a command input by a gesture. In the present embodiment, the server device 20 performs recognition processing on a command input by voice.

First, the configuration of the information processing apparatus 10 will be described. As illustrated in FIG. 2, the information processing apparatus 10 includes a display unit 11, an image capture unit 12, a voice output unit 13, a voice input unit 14, a storage unit 15, a communication unit 16, and a control unit 17. Note that the information processing apparatus 10 may include an input unit (for example, a keyboard, a mouse, or the like) that receives various operations from a user of the information processing apparatus 10, or the like.

The display unit 11 is a display device that displays various types of information. Examples of the display unit 11 include display devices such as a liquid crystal display (LCD) and a cathode ray tube (CRT). The display unit 11 displays various types of information under the control of the control unit 17. For example, the display unit 11 displays a screen displaying an operation target with a temporal change.

The image capture unit 12 is an imaging device such as a camera. The image capture unit 12 captures an image under the control of the control unit 17, and outputs captured image data to the control unit 17.

The voice output unit 13 is a sound output device such as a speaker. The image capture unit 12 outputs various types of voice under the control of the control unit 17.

The voice input unit 14 is a sound collecting device such as a microphone. The image capture unit 12 collects user's voice and the like, and outputs collected voice data to the control unit 17.

The storage unit 15 is implemented by semiconductor memory elements such as random access memory (RAM) or flash memory, or storage devices such as a hard disk or an optical disk. The storage unit 15 stores various programs including a control program for controlling state storage processing and command processing to be described below. The storage unit 15 stores various types of data.

The communication unit 16 is implemented by a network interface card (NIC), for example. The communication unit 16 is connected to a network N (the Internet or the like) in a wired or wireless channel, and transmits/receives information to/from devices such as the server device 20 via the network N.

The control unit 17 is implemented by execution of programs stored inside the information processing apparatus 10 by a central processing unit (CPU), a micro processing unit (MPU), or the like, using random access memory (RAM) or the like, as a working area. In addition, the control unit 17 is a controller and may be implemented by, for example, an integrated circuit such as an application specific integrated circuit (ASIC) or a field programmable gate array (FPGA).

Next, the configuration of the server device 20 will be described. As illustrated in FIG. 2, the server device 20 includes a communication unit 21, a storage unit 22, and a control unit 23. The server device 20 may include an input unit (for example, a keyboard, a mouse, or the like) that receives various operations from the user of the server device 20, or the like, and a display unit (for example, a liquid crystal display or the like) for displaying various types of information.

The communication unit 21 is implemented by a NIC, for example. The communication unit 21 is connected to a network N (the Internet or the like) in a wired or wireless channel, and transmits/receives information to/from devices such as the information processing apparatus 10 via the network N.

The storage unit 22 is implemented by a semiconductor memory element such as RAM or flash memory, or a storage device such as a hard disk or an optical disk, for example. The storage unit 22 stores various programs. The storage unit 22 stores various types of data. For example, the storage unit 22 stores user data 40 and content data 41.

The user data 40 is data storing various types of individual user's information such as a perception time and an operation history of each user. The content data 41 is data storing pieces of content such as music and video.

The control unit 23 is implemented by execution, by a CPU, an MPU, or the like, of a program or the like stored inside the server device 20, as a working area. Furthermore, the control unit 17 may be a controller and may be implemented by using an integrated circuit such as an ASIC or an FPGA, for example.

In the present embodiment, the control unit 17 of the information processing apparatus 10 and the control unit 23 of the server device 20 receive an input of a command by a gesture by performing processing in a distributed manner, and perform processing of a command recognized from the gesture. For example, the control unit 17 includes a detection unit 30, a command processing unit 31, and an output control unit 32, while the control unit 23 includes a voice recognition unit 33, a semantic comprehension unit 34, and an image recognition unit 35, so as to implement or execute functions and effects of information processing described below. Note that the control unit 17 and the control unit 23 are not limited to the configuration illustrated in FIG. 2, and may have other configurations as long as the configurations can implement the functions and effects of the information processing described below.

Figure 3:
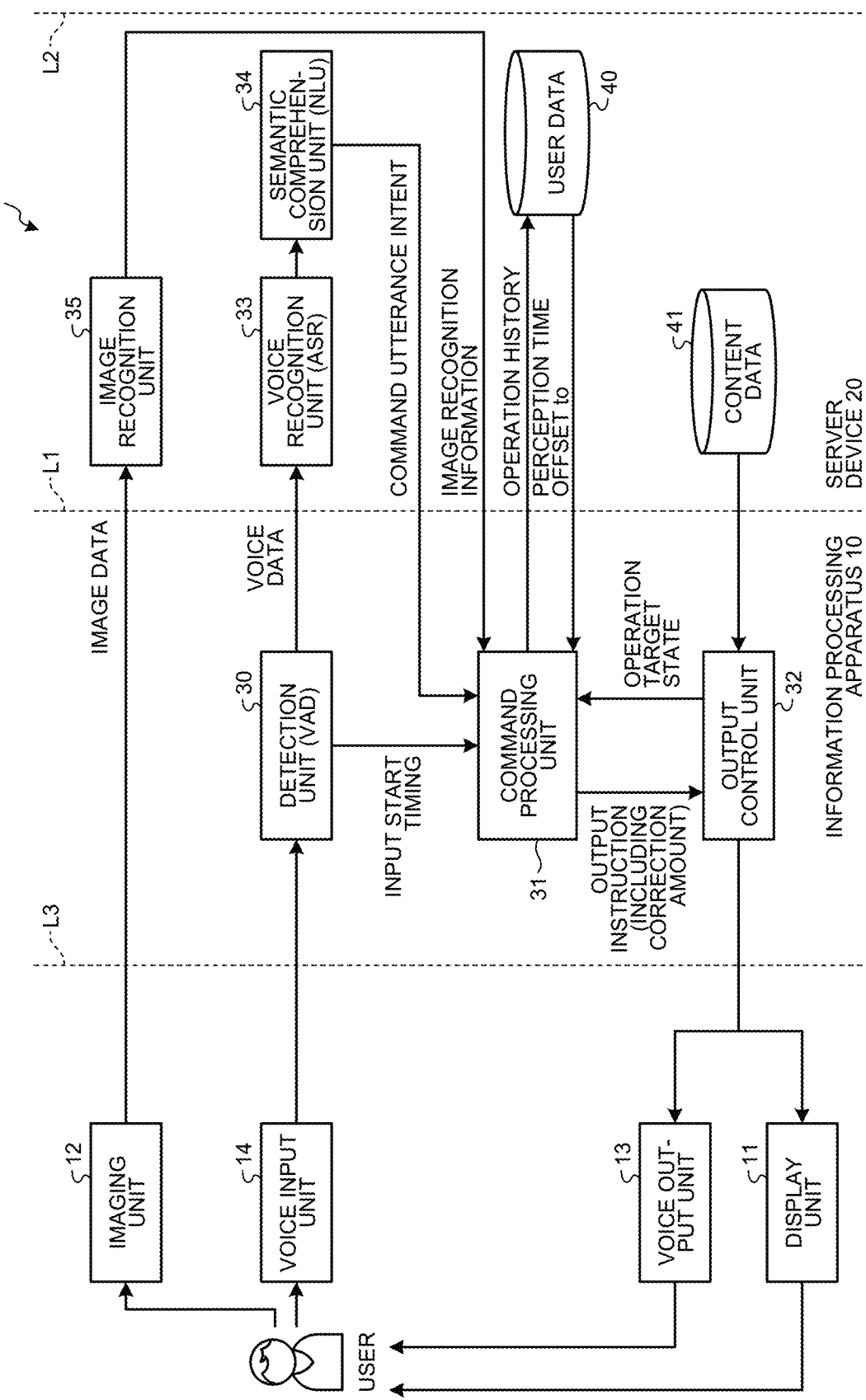
FIG. 3 is a diagram illustrating a functional configuration example of the information processing system according to the embodiment of the present disclosure.

FIG. 3 is a diagram illustrating a functional configuration example of the information processing system 1 according to the embodiment of the present disclosure. In FIG. 3, the configuration is divided into left/right parts such that the left side of a broken line L1 is a component of the information processing apparatus 10 while the right side of the broken line L1 is a component of the server device 20. Note that the boundary between the components of the information processing apparatus 10 and the server device 20 is not limited to the broken line L1. The detection unit 30, the command processing unit 31, the output control unit 32, the voice recognition unit 33, the semantic comprehension unit 34, the image recognition unit 35, the user data 40, and the content data 41 may be components of either the information processing apparatus 10 or the server device 20. For example, it is allowable to use a broken line L2 as the boundary between the components of the information processing apparatus 10 and the server device 20 to define all the components to belong to the information processing apparatus 10. It is also allowable to use a broken line L3 as the boundary between the components of the information processing apparatus 10 and the server device 20 to define all the components to belong to the server device 20. In this case, the server device 20 corresponds to the information processing apparatus according to the present disclosure.

The voice uttered by the user is input to the information processing system 1 through the voice input unit 14. The voice input unit 14 performs A/D conversion on the input voice into voice data, and outputs the converted voice data to the detection unit 30.

The detection unit 30 detects an utterance section by performing voice activity detection (VAD) on the input voice data, and outputs the voice data in the utterance section to the voice recognition unit 33. In addition, the detection unit 30 detects an input start timing of a command by voice from the input voice data. For example, the detection unit 30 detects the timing at which the utterance section is enabled in the voice activity detection as the input start timing. The detection unit 30 outputs the detected input start timing to the command processing unit 31.

The voice recognition unit 33 performs automatic speech recognition (ASR) processing on the voice data detected as the utterance section in the voice activity detection, and converts the processed voice data into text data. With this configuration, the user's voice that has been input to the voice input unit 14 is converted into a text. The semantic comprehension unit 34 performs semantic comprehension processing such as natural language understanding (NLU) on the text data converted by the voice recognition unit 33, and estimates an utterance intent (Intent+Entity) by this processing. The semantic comprehension unit 34 outputs utterance intent information indicating the estimated utterance intent to the command processing unit 31.

The image of the user is input to the information processing system 1 through the image capture unit 12. The image capture unit 12 periodically captures an image and outputs captured image data to the image recognition unit 35. The image recognition unit 35 performs face recognition and line-of-sight recognition on input image data, recognizes a face direction and a line of sight regarding the recognized face, and outputs image recognition information indicating a recognition result to the command processing unit 31.

Based on an output instruction from the command processing unit 31, the output control unit 32 outputs the content of the content data 41 to the user through the voice output unit 13 and the display unit 11.

The command processing unit 31 receives an input of the input start timing from the detection unit 30, receives an input of the utterance intent information from the semantic comprehension unit 34, and receives an input of the image recognition information from the image recognition unit 35. In addition, the command processing unit 31 acquires the state of the operation target from the output control unit 32. For example, the command processing unit 31 acquires, from the output control unit 32, the state of the operation target at the input start timing detected by the detection unit 30. The command processing unit 31 issues an output instruction to the output control unit 32 based on the input start timing input from the detection unit 30, the utterance intent information input from the semantic comprehension unit 34, the image recognition information input from the image recognition unit 35, and the state of the operation target acquired from the output control unit 32. The command processing unit 31 performs processing of a command recognized from a voice based on the state of the operation target at the input start timing detected by the detection unit 30. For example, the command processing unit 31 stores the time of the input start timing or the state of the operation target at the time. Subsequently, the command processing unit 31 performs the processing of the command on the state of the operation target that has gone back to the state at the stored time, or on the stored state of the operation target.

Figure 4:
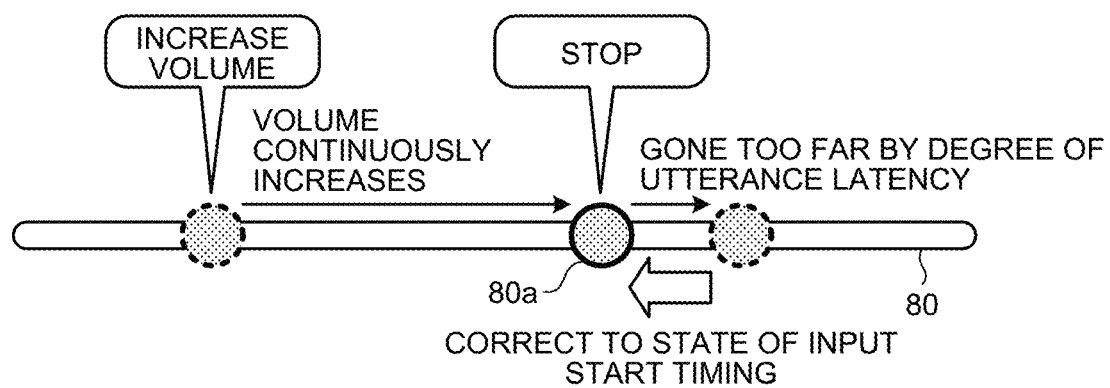
FIG. 4 is a diagram illustrating an example of operation using voice on an operation target with a temporal change according to the embodiment of the present disclosure.

With this configuration, processing of the command can be performed on the operation target at an intended timing. FIG. 4 is a diagram illustrating an example of operation using voice on an operation target with a temporal change according to the embodiment of the present disclosure. FIG. 4 illustrates the volume indicator 80 similarly to FIG. 1. On the volume indicator 80, the slider bar 80a moves with the operation of the volume by voice. For example, although it is similar to FIG. 1 in that, when the user utters "increase the volume" and then utters "stop", the volume temporarily overshoots by the degree of the latency but the stop processing is performed with the corrected volume, that is, the volume corrected to the position of the input start timing of the utterance "stop". In this manner, the processing of the command can be performed on the volume indicator 80 at an intended timing.

2-2. Specific Examples

Figure 5:
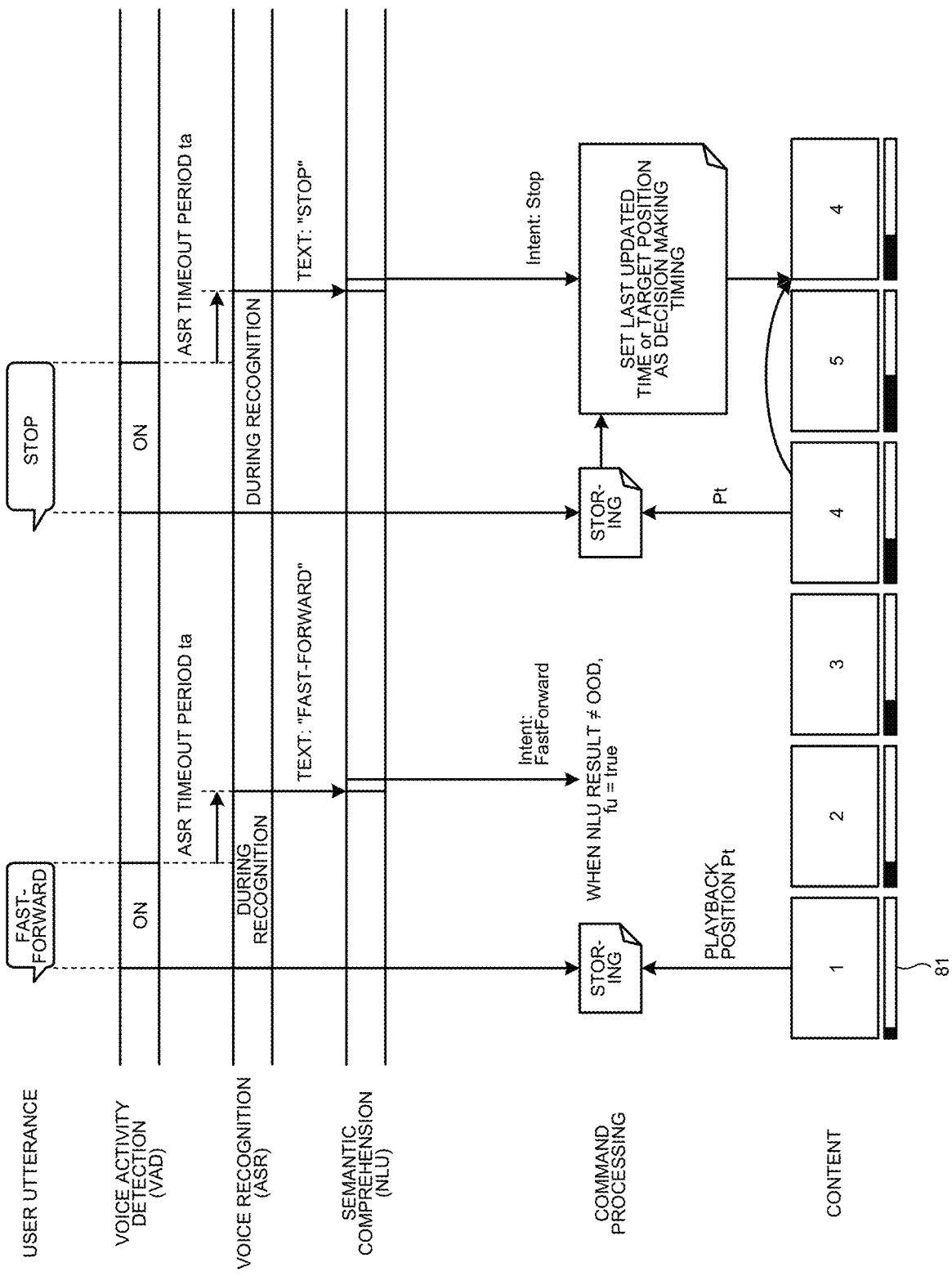
FIG. 5 is a diagram describing a method of detecting an input start timing according to the embodiment of the present disclosure.

Hereinafter, embodiments of the present disclosure will be described using specific examples. First, a method of detecting an input start timing will be described. FIG. 5 is a diagram describing a method of detecting an input start timing according to the embodiment of the present disclosure. FIG. 5 illustrates a sequence of performing an operation related to playback of a video content by using a command by voice. FIG. 5 illustrates individual periods, namely, periods of user's utterance, utterance section detection, voice recognition, and semantic comprehension. In addition, pieces of video content "1" to "5" displayed by playback are illustrated in the lower part of FIG. 5, and a seek bar 81 indicating a playback position of the video is illustrated in the lower part of each of the pieces of video content. FIG. 5 illustrates a case where the user makes an utterance "fast-forward" in order to fast-forward the video content and then utters "stop" at a timing at which the user desires to stop the content.

The detection unit 30 detects an input start timing of the command by voice from the input voice data. For example, the detection unit 30 detects the timing at which the utterance section is enabled in the voice activity detection as the input start timing. Note that the detection unit 30 may detect, as the input start timing, a timing at which the input volume (for example, root mean square (RMS)) indicated by the voice data is increased to a certain threshold or more, instead of a timing at which the utterance section is enabled.

The command processing unit 31 stores the state of the operation target when an update flag fu=True (described below) at the input start timing detected by the detection unit 30. In the example of FIG. 5, a playback position Pt of the video content "1" at the start timing of the utterance of "fast-forward" is stored.

When the ASR timeout period ta elapses after the user utters "fast-forward", the voice data of the utterance of "fast-forward" is converted into an utterance text "fast-forward" by the voice recognition unit 33 and transferred to the semantic comprehension unit 34. Subsequently, the utterance intent Intent=FastFoward is input to the command processing unit 31 as a result of estimation made by the semantic comprehension unit 34.

In a case where the utterance intent Intent is other than an uninterpretable intent out of domain (OOD), the command processing unit 31 sets an update flag fu so as to update the state of the operation target at the subsequent start timing (update flag fu=True). The update flag fu is a flag indicating whether to update and store the state of the operation target at the subsequent start timing. In the example of FIG. 5, the utterance intent Intent=FastFoward is an intent interpretable by the system (that is, other than OOD), and thus, the update flag fu=True is set.

At the start timing of the next utterance of "stop", the update flag fu=True. Therefore, the command processing unit 31 discards the playback position Pt stored at the start timing of the utterance of "fast-forward", and stores the playback position Pt at the start timing of the utterance of "stop".

When the ASR timeout period ta has elapsed after the utterance of "stop", the voice data of the utterance of "stop" is converted into an utterance text "stop" by the voice recognition unit 33 and transferred to the semantic comprehension unit 34. The utterance intent Intent=Stop is then input to the command processing unit 31 as a result of estimation made by the semantic comprehension unit 34. Having received the utterance intent Intent=Stop from the semantic comprehension unit 34 after the utterance of "stop", the command processing unit 31 stops fast-forwarding at the position of the playback position Pt. In the example of FIG. 5, fast-forwarding is stopped in the video content "4" being displayed at the start timing of the utterance of "stop". This means that correction processing has been performed in which the timing at which the user has made a decision to stop fast-forwarding is detected as the input start timing of the utterance "stop", and the state of the operation target that changes with time is returned to the state at the timing of the user's decision making. In the above description, the command processing unit 31 stores and updates the playback position Pt as the state of the operation target at the input start timing. Alternatively, however, the command processing unit 31 may store a time Tb at the input start timing as the state of the operation target at the input start timing, and turn the state of the operation target back to the state at the time Tb by a method to be described below to perform processing of the command.

Meanwhile, there is a case where the user utters a filler when uttering a command by voice. A filler is a linking word that is sandwiched between utterances but does not have a specific meaning as a single word, and examples of which include "uh", "well", or "um". When speaking a command, the user sometimes utters a filler immediately before the command. For example, there is a case where the user utters a filler immediately before the command, such as a case where the user suddenly notices that it is the utterance timing of the command. On the other hand, the user might utter a filler regardless of the command.

Therefore, in a case where a filler is uttered immediately before the command, the command processing unit 31 performs processing of the command on the state of the operation target at the timing of starting occurrence of the filler.

Figure 6:
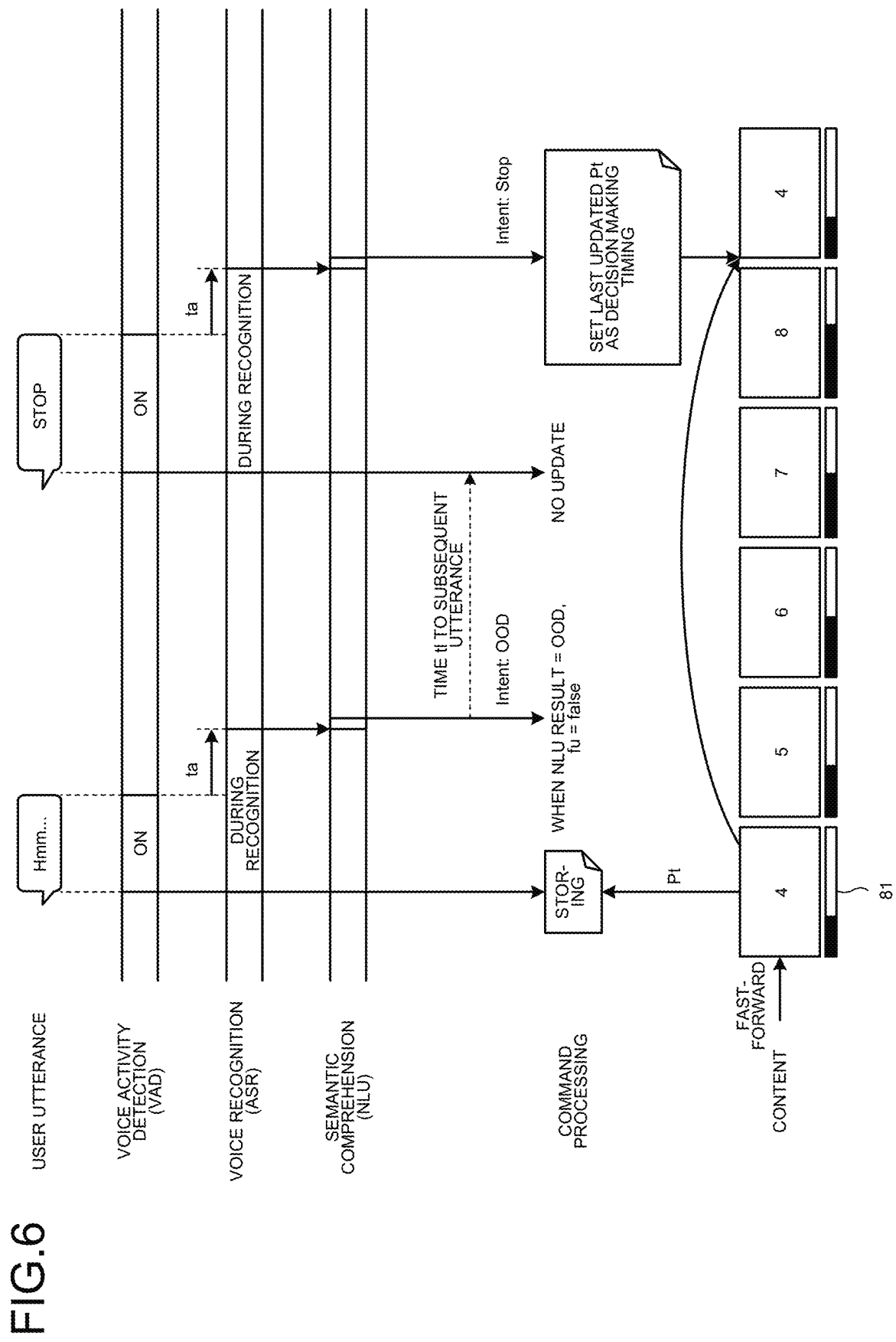
FIG. 6 is a diagram describing the method of detecting an input start timing according to the embodiment of the present disclosure.

FIG. 6 is a diagram describing a method of detecting an input start timing according to the embodiment of the present disclosure. FIG. 6 illustrates a sequence of performing, by using a command by voice, an operation related to playback of the video content after the utterance of "fast-forward" in FIG. 5. FIG. 6 illustrates a case where the user makes an utterance "Hmm . . . " at a timing at which the user desires to stop, and then utters "stop".

In a case where a command by voice has been input within a predetermined specified time th after the filler utterance, the command processing unit 31 performs processing of the command in a state of the operation target returned to the state of the input start timing of the filler utterance. The specified time th is a time by which it is possible to regard that the filler is emitted immediately before the command and that the filler is uttered together with the command. For example, the specified time th is 2 seconds.

For example, the command processing unit 31 stores the state of the operation target when the update flag fu=True at the utterance input start timing such as "Hmm . . . ". In the example of FIG. 6, since the update flag fu=True because there is the utterance of "fast-forward" in FIG. 5 before "Hmm . . . ", the playback position Pt of the video content at the input start timing of the utterance "Hmm . . . " is stored.

In a case where the utterance intent Intent is OOD, the command processing unit 31 sets the update flag fu (update flag fu=False) so as not to update the state of the operation target at the subsequent start timing. In the example of FIG. 6, the estimation result by the semantic comprehension unit 34 of the filler utterance "Hmm . . . " of the user is utterance intent Intent=OOD, and thus the update flag fu=False. In a case where the setting is update flag fu=False, the command processing unit 31 measures a time t1 before the subsequent utterance start timing. In a case where the time t1 is the specified time th or less, the command processing unit 31 does not update the state (playback position Pt) of the operation target at the input start timing of the subsequent command. In contrast, when the time t1 is longer than the specified time th, the command processing unit 31 updates the state of the operation target (playback position Pt) at the input start timing of the subsequent command with the setting update flag fu=True.

That is, when the time t1 is the specified time th or less, the filler is regarded as a filler occurring immediately before the command, and the processing of the command is performed on the state of the operation target at the input start timing of the filler. In contrast, when the time t1 is longer than the specified time th, the filler is regarded as a filler occurring regardless of the command, and the processing of the command is performed on the state of the operation target at the input start timing of the subsequent command.

In the example of FIG. 6, the time t1 before the input start timing of the subsequent "stop" is the specified time th or less. Accordingly, the command processing unit 31 does not update the state (playback position Pt) of the operation target at the input start timing of "stop". With this processing, the state (playback position Pt) of the operation target stored at the input start timing of "Hmm . . . " is held. Having received the utterance intent Intent=Stop from the semantic comprehension unit 34 after the utterance of "stop", the command processing unit 31 stops the fast-forwarding at the position of the playback position Pt stored at the input start timing of "Hmm . . . ". In the example of FIG. 6, fast-forwarding is stopped in the video content "4" displayed at the start timing of the utterance of "Hmm . . . ". This means that, in a case where the utterance time interval between the filler and the command is short, the timing at which the user has made a decision to stop fast-forwarding is detected as the start timing of the utterance of "Hmm . . . ", which is the filler before the utterance of "stop", and the correction is performed accordingly. With this configuration, even when the user utters the filler immediately before the command, the processing of the command can be performed at an intended timing.

The specified time th may be set as a variable time. For example, the command processing unit 31 may change the specified time th such that the higher the moving velocity of the operation target, the greater the specified time th. In addition, in a case where the user has no confidence in the command execution timing, for example, when the user does not exactly know whether it is the command execution timing, the pitch of the ending of the utterance tends to rise. Based on this tendency, the command processing unit 31 may extract the pitch of the utterance and change the specified time th to a large value in a case where the pitch of the ending of the word rises.

Meanwhile, in the presence of a plurality of users, there is a case where a conversation between the users is erroneously recognized as a command.

To handle this, the command processing unit 31 determines whether the user's utterance is directed to the information processing system 1 and performs processing of a command.

Figure 7:
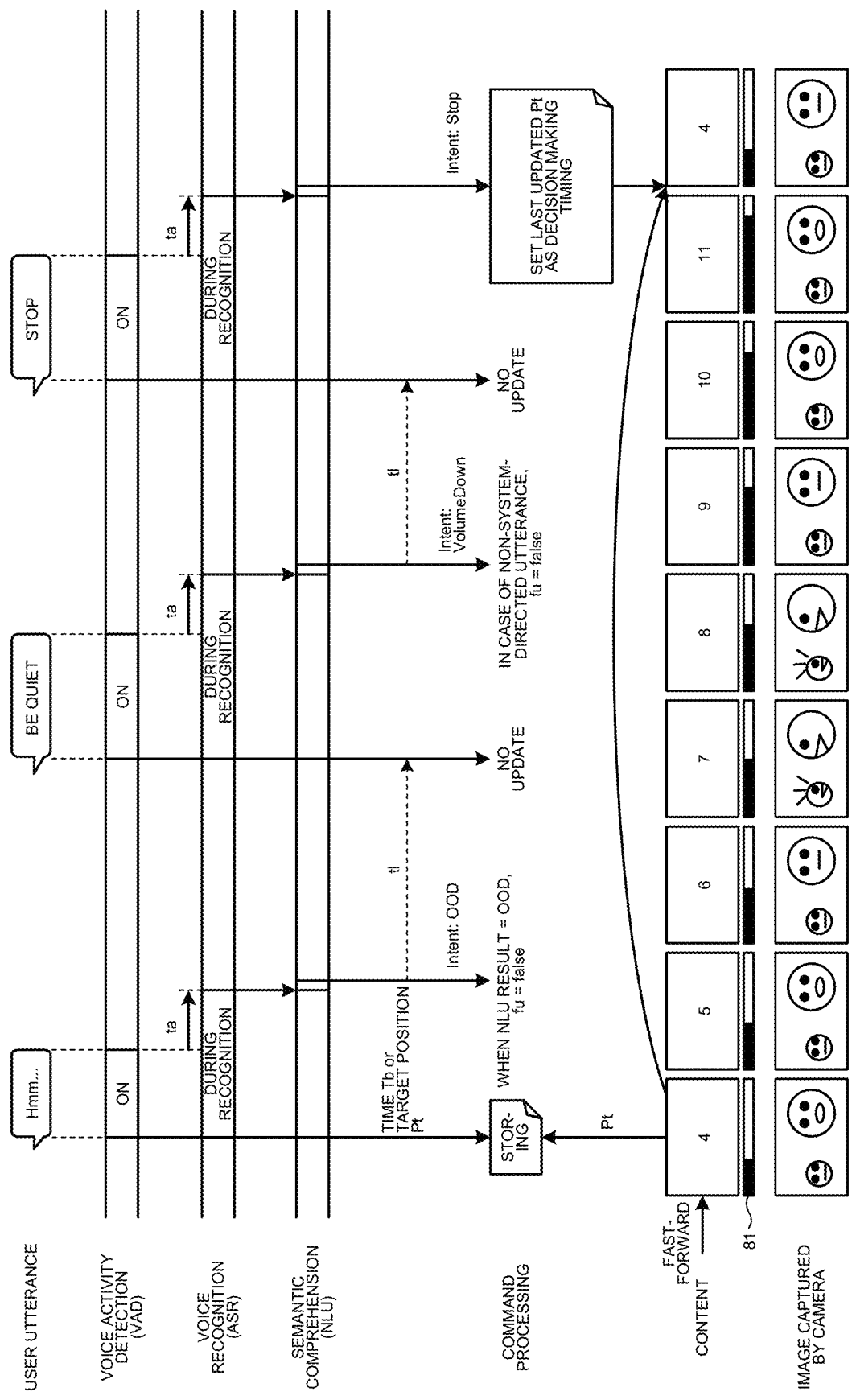
FIG. 7 is a diagram describing the method of detecting an input start timing according to the embodiment of the present disclosure.

FIG. 7 is a diagram describing a method of detecting an input start timing according to the embodiment of the present disclosure. FIG. 7 illustrates a sequence of performing, by using a command by voice, an operation related to playback of the video content after the utterance of "fast-forward" in FIG. 5. The lower part of FIG. 7 illustrates an image captured by the image capture unit 12. The image includes two users. Here, the two users are parent and child. FIG. 7 illustrates a case where, in the middle of the time when one user (parent) is uttering a filler "Hmm . . . " during determination of the stop timing, another user (child) makes noise, and thus, the one user (parent) utters "be quiet" to the other user (child) and thereafter utters "stop" as a command.

The command processing unit 31 determines whether the user is viewing the display unit 11 from at least one of the direction of the face and the line of sight recognized by the image recognition unit 35 when the command is input. In a case where the user is viewing the display unit 11, the command processing unit 31 performs processing of a command based on the state of the operation target at the input start timing detected by the detection unit 30.

For example, the image recognition unit 35 detects the face direction and the line of sight of the user by performing image recognition processing on images around the device captured by the image capture unit 12. The command processing unit 31 determines whether the user's utterance is directed to the information processing system 1 based on the face direction or the line of sight detected by the image recognition unit 35. For example, when the detected face direction or line of sight is in the direction of the display unit 11, the command processing unit 31 determines that the utterance is directed to the information processing system 1. In contrast, when the face direction or the line of sight is not in the direction of the display unit 11, the command processing unit 31 determines that the utterance is not directed to the information processing system 1. Hereinafter, an utterance that is not directed to the information processing system 1 is referred to as a "non-system-directed utterance". The result of this system-directed utterance determination is input to the command processing unit 31 and used for setting determination of the update flag fu.

When the utterance intent Intent is a non-system-directed utterance, the command processing unit 31 sets the update flag fu (update flag fu=False) so as not to update the state of the operation target at the subsequent start timing, even in a case where the utterance intent Intent estimated by the semantic comprehension unit 34 is other than OOD.

In the example of FIG. 7, regarding "be quiet" uttered by the user (parent) toward a child in the vicinity, the command processing unit 31 receives VolumeDown (intention to lower the volume of the device, which is other than OOD) as the utterance intent Intent. However, due to the determination that the utterance in this utterance period is a non-system-directed utterance, the command processing unit 31 sets the update flag fu=False. In other words, since the utterance of "be quiet" made by the user (parent) is a non-system-directed utterance, the volume of the device is not to be lowered.

In the example of FIG. 7, since the filler utterance "Hmm . . . " is the utterance intent Intent=ODD, the setting will be update flag fu=False. Thereafter, since "be quiet" in which the utterance is started at the time t1 of the specified time th or less directed toward the surrounding user is a non-system-directed utterance, the setting will be update flag fu=False. Further, thereafter, "stop" is uttered at a time t1 being the specified time th or less. Having received the utterance intent Intent=Stop from the semantic comprehension unit 34 after the utterance of "stop", the command processing unit 31 stops the fast-forwarding at the position of the playback position Pt stored at the input start timing of "Hmm . . . ". In the example of FIG. 7, fast-forwarding is stopped in the video content "4" displayed at the start timing of the utterance of "Hmm . . . ". This means that even in a case where there is a non-system-directed utterance between the filler and the command, the timing at which the user made a decision to stop fast-forwarding is detected as the input start timing of the utterance of the filler. With this configuration, even in the presence of a plurality of users in the vicinity and there is a conversation between the users, it is also possible to correctly perform the processing of the command at the user's decision-making timing by the system-directed utterance determination.

The following will describe how the command processing unit 31 turns the state of the operation target back when the time of the input start timing is stored. The input start timing is defined as time Tb.

In a case where the change of the operation target is a uniform velocity movement, a correction amount $\Delta p$ of the state of the operation target can be expressed as the following Formula (1).

$$\Delta p = vn \times \Delta t \tag{1}$$

where:
vn is the velocity of the operation target at the time of receiving the utterance intent Intent.

$\Delta t$ is a time difference (Tn−Tb) between a time Tn when receiving the utterance intent Intent and a time Tb of the input start timing.

When the operation target is moving in deceleration movement, the correction amount $\Delta p$ of the state of the operation target can be expressed as the following Formula (2).

$$\Delta p = vn \times \Delta t + (a \times \Delta t^2 / 2) \tag{2}$$

where:
a is the deceleration of the operation target.

Meanwhile, there can be a time-lag from the time when the user has perceived that a desired timing has arrived and the time of user's utterance of a command.

Therefore, the command processing unit 31 may perform processing of a command by providing an offset in consideration of a perception time until the user starts utterance to the operation target. The command processing unit 31 sets, as an offset of the correction amount, the perception time to until the point where the user makes a decision while receiving feedback and starts utterance. For example, the command processing unit 31 performs processing of a command based on the state of the operation target at the timing changed from the input start timing detected by the detection unit 30 by a length of the perception time corresponding to an attribute of the user who inputs the command.

In a case where the time Tb being the input start timing is stored as the state of the operation target at the input start timing, the command processing unit 31 obtains the time difference $\Delta t$ using the following Formula (3).

$$\Delta t = Tn - Tb + to \tag{3}$$

where:
to is the perception time.

The correction amount $\Delta p$ of the state of the operation target is obtained from the above Formulas (1) and (2) using the time difference $\Delta t$ obtained from the Formula (3).

On the other hand, in a case where a state Pt of the operation target is to be stored as the state of the operation target at the input start timing, the command processing unit 31 obtains a correction amount $\Delta po$ for returning the state Pt of the operation target to the state before the perception time to, from the perception time to. Subsequently, the command processing unit 31 further performs correction of the correction amount $\Delta po$ on the state Pt of the operation target.

When the operation target is moving at a uniform velocity, the correction amount $\Delta po$ can be expressed as the following Formula (4).

$$\Delta po = vb \times to \tag{4}$$

where:
vb is the moving velocity of the operation target at the input start timing.

When the operation target is moving in deceleration movement, the correction amount $\Delta po$ can be expressed as the following Formula (5).

$$\Delta po = vb \times to + (a \times to^2 / 2) \tag{5}$$

where:
a is the deceleration of the operation target.

The perception time to may be set as a variable time by any one of the following methods or combinations. For example, the image recognition unit 35 estimates the age of the user who performs utterance based on the image obtained by the image capture unit 12. The command processing unit 31 may change the value of the perception time to such that the higher the age estimated by the image recognition unit 35 compared with a specified value (the older the user), the greater the value of the perception time to. Furthermore, the perception time to may be obtained by estimating the tendency of the perception time of the individual user based on the operation history of the user on a user-by-user basis.

Figure 8:
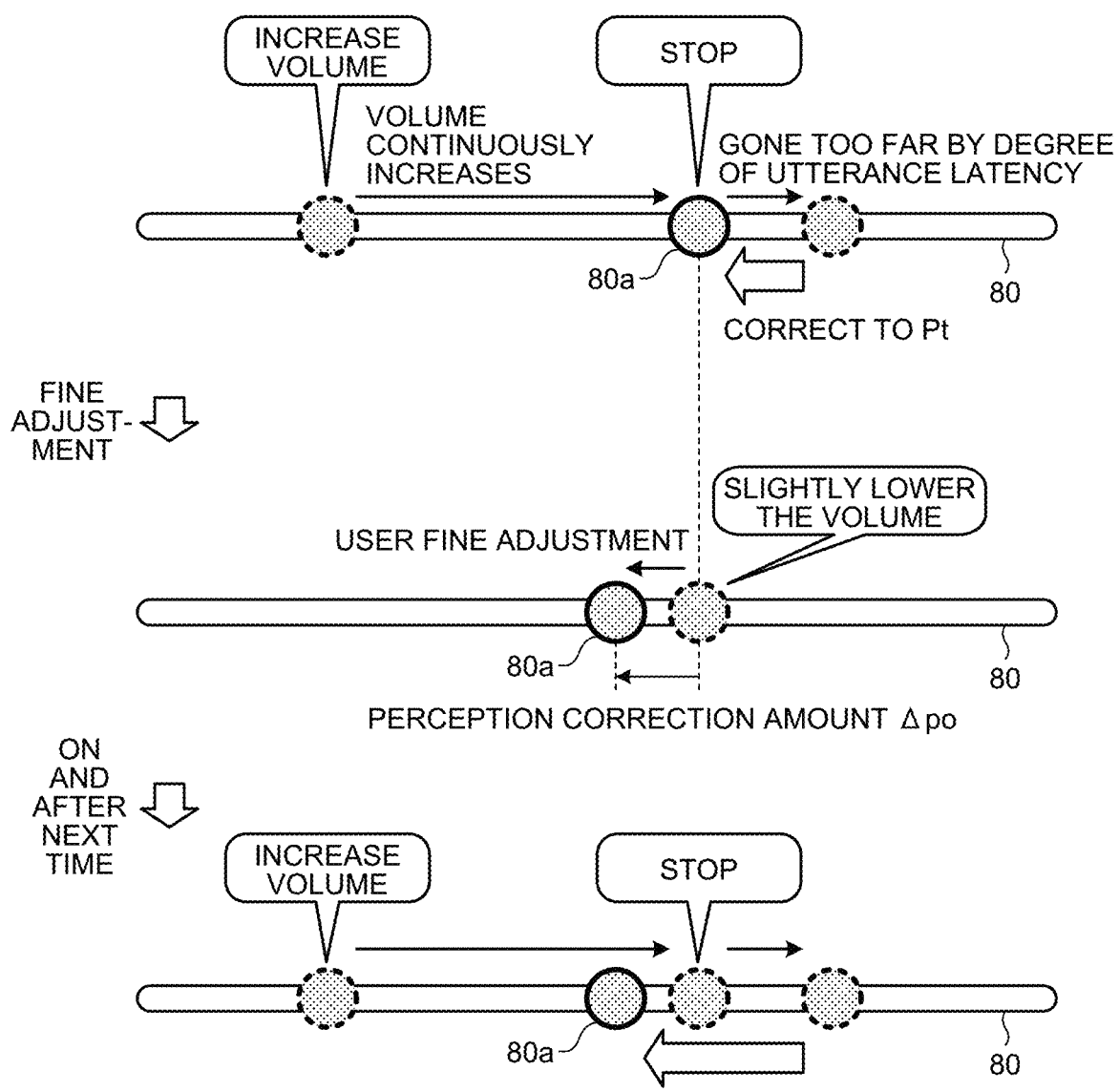
FIG. 8 is a diagram describing an example of estimating a tendency of a perception time of an individual user based on an operation history according to the embodiment of the present disclosure.

FIG. 8 is a diagram describing an example of estimating a tendency of a perception time of an individual user based on an operation history according to the embodiment of the present disclosure. FIG. 8 illustrates a volume indicator 80 as an operation target with a temporal change. On the volume indicator 80, the slider bar 80a moves with the operation of the volume by voice.

In an initial state, the user's perception time to is set to 0. The user utters "increase the volume" to continuously increase the volume, and utters "stop" at a timing when the user desires to stop. When "stop" is uttered, the volume on the volume indicator 80 overshoots by the degree of latency. However, the volume will be corrected to the position Pt of the input start timing of the utterance of "stop" by the technique of the present embodiment.

When the position Pt is slightly shifted in the direction in which the volume is large compared to a target position of the user due to the lime lag attributed to the user's perception time to, the user utters "slightly lower the volume" to perform fine adjustment. The information processing system 1 calculates an amount obtained by fine adjustment within a predetermined specified time after continuous movement of a certain amount or more, as the correction amount $\Delta po$ for perception. The information processing system 1 calculates the perception time to from the correction amount $\Delta po$ by the following Formula (6), and stores the calculated perception time to in the user data 40 in association with the user. For example, the information processing system 1 allows the user to input identification information used to identify the user, such as a user ID. The information processing system 1 stores the perception time to in the user data 40 in association with the user's identification information that has been input. Note that the user's identification information may be user's feature information recognized based on an image obtained by capturing the user or on the user's voice.

$$\text{perception time } to = \Delta po/vb \quad (6)$$

where:
vb is the moving velocity of the operation target when the overshoot occurs.

On and after the next time, the command processing unit 31 reads the perception time to corresponding to the user's identification information from the user data 40, and makes a correction toward the user's operation in consideration of the perception time to. For example, in a case where the user utters "increase the volume" to continuously increase the volume and utters "stop", the volume is corrected from the position Pt of the input start timing of "stop" to the position Pt+(to×vb) in consideration of the perception time to. In this manner, by correcting, on the command processing unit 31, the operation target in consideration of the user' perception time to, it is possible to perform an operation on the operation target at the timing intended by the user. For example, in the case of FIG. 8, it is possible to quickly correct the volume to the volume intended by the user on and after the next time.

As illustrated in FIG. 8, when the user's fine adjustment is in a forward direction which is same as the correction direction of the position Pt, the correction amount $\Delta po$ and the perception time to both take positive values. In contrast, when the user's fine adjustment is in the direction opposite to the correction direction of the position Pt, the correction amount $\Delta po$ and the perception time to both take negative values. For example, when the user has a tendency to have a delayed perception and makes an utterance with a delay, the perception time to takes a positive value and this increases the total correction amount. In contrast, when the user has a tendency to make an early utterance with prediction, the perception time to takes a negative value, and this decreases the correction amount.

In order to allow the user to perceive the execution of the learning regarding the correction after the user's operation is completed, the output control unit 32 may output voice synthesis (referred to as text to speech (TTS)) indicating that the correction value of the operation target will change on and after the next time based on the current operation. In addition, the perception time to obtained by fine adjustment of the user may be an average of a plurality of latest records (for example, three records) on the operation history. For example, the command processing unit 31 accumulates and stores the operation history regarding user's fine adjustment in the user data 40 in association with the user's identification information. The command processing unit 31 calculates the perception time to for each user based on the accumulated operation history, and stores the perception time to in the user data 40 in association with the user's identification information. At the time of correction processing in the voice command processing, the command processing unit 31 may read the perception time to corresponding to the user's identification information from the user data 40 and perform correction regarding the operation target.

Figure 9A:
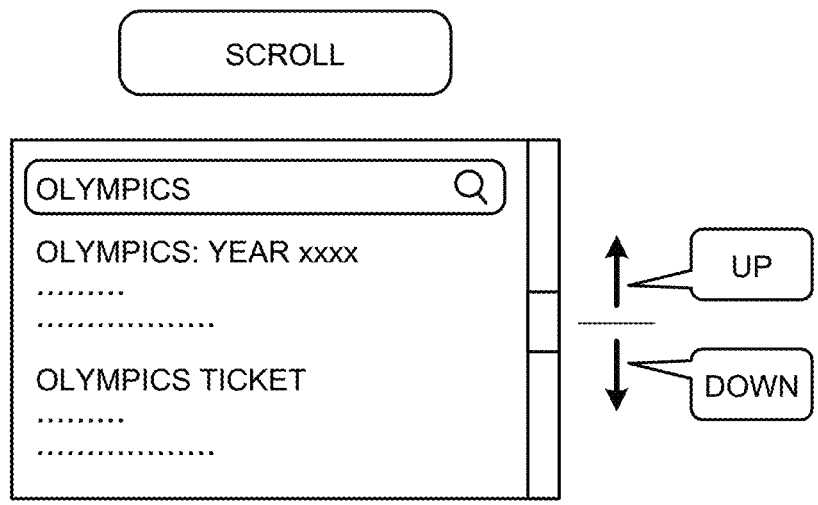
FIG. 9A is a view illustrating another example of an operation target with a temporal change according to the embodiment of the present disclosure.
Figure 9B:
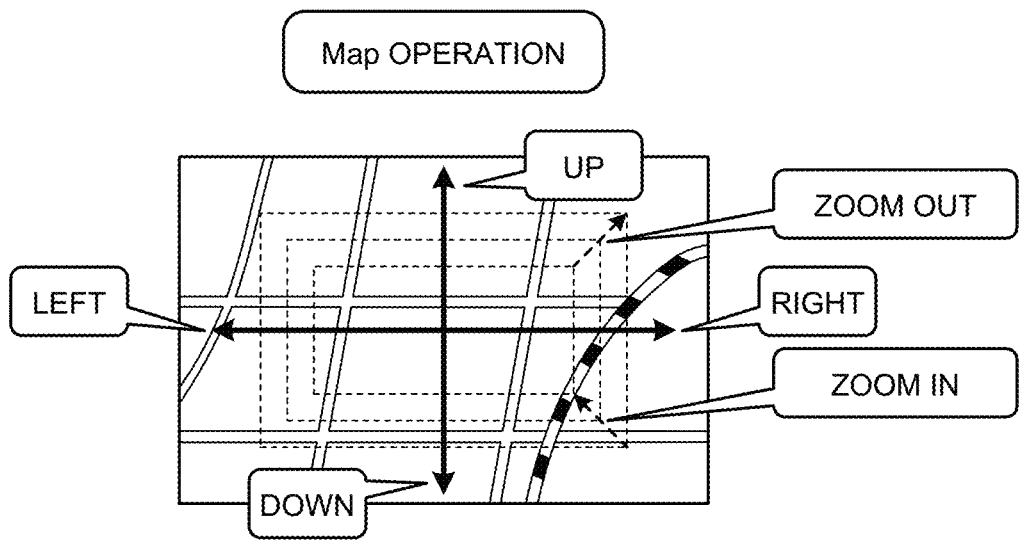
FIG. 9B is a view illustrating another example of the operation target with the temporal change according to the embodiment of the present disclosure.
Figure 9C:
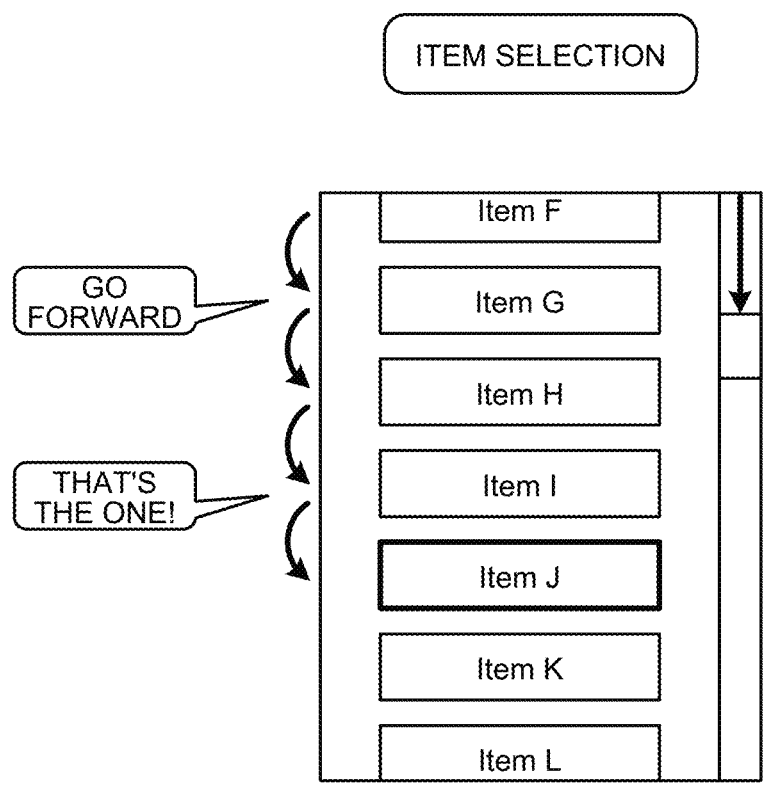
FIG. 9C is a view illustrating another example of the operation target with the temporal change according to the embodiment of the present disclosure.

Here, in the present embodiment, the case where the operation target with the temporal change is the operation related to the volume indicator or the playback of the video content has been described as an example, but the present invention is not limited thereto. The operation target may be any object as long as it is a change accompanying a temporal change. In addition, the operation target may be operated in either continuous operation or discrete operation. Examples of the target of continuous operation include a scroll operation, a two-dimensional movement and scaling (zoom-in/out) operation of a map, and a media playback control operation of music, video, and the like. Furthermore, examples of the target of discrete operation include an item selection operation and the Cover Flow technique, which displays content such as photographs by visually flipping operations. FIG. 9A is a view illustrating another example of an operation target with a temporal change according to the embodiment of the present disclosure. FIG. 9A illustrates a scroll operation in the vertical direction of the screen. The technology of the present disclosure may be applied to a case where a command of a scroll operation is input using a voice. FIG. 9B is a view illustrating another example of the operation target with the temporal change according to the embodiment of the present disclosure. FIG. 9B illustrates two-dimensional movements in vertical and horizontal directions and scaling operations on a map displayed on the screen. The technology of the present disclosure may be applied to a case where commands for two-dimensional movement and scaling operation on a map are input using a voice. FIG. 9C is a view illustrating another example of the operation target with the temporal change according to the exemplary embodiment of the present disclosure. FIG. 9C illustrates item selection of selecting an item to be selected from a plurality of items. The technology of the present disclosure may be applied to a case where an item selection command is input using a voice. In the presence of a large number of items to be selected, or in a case of performing item selection of items such as a proper noun difficult to be recognized by voice recognition or symbol strings such as an ID difficult to be expressed by utterance, it is effective to use an item selection method of selecting by moving the focus position.

The operation target is not limited to the operation displayed on the screen. For example, examples of the operation target include an operation of stopping while listening to the text read aloud or replaying of the text read aloud with the reading position turned back to the previous position, an operation of adjusting the brightness of the illumination, an operation of adjusting the volume in a device without an indicator display, and an operation of setting the temperature of the air conditioner. Other examples of the operation target include destination/waypoint setting on a map of a car navigation system, movement of a viewpoint or an object in a three-dimensional space of virtual reality (VR), time-period/time-point setting, and the like. In a car navigation system having difficulty in operation by hand during driving, and in VR having difficulty in operation by hand due to the use of mounting a head mounted display, the operations by voice using the technology of the present disclosure will be effective. In addition, as another operation target, an operation by voice using the technology of the present disclosure is effective for a moving operation such as turning a page when displaying an electronic document such as an electronic medical chart in a hospital. For example, in an operating room or the like, operation by hand becomes difficult, and thus operation using voice using the technology of the present disclosure is effective.

FIG. 10 is a diagram illustrating an example of operation using voice on an operation target with a temporal change according to the embodiment of the present disclosure. FIG. 10 illustrates item selection as an operation target with a temporal change. FIG. 10 illustrates a case of selecting an item by moving the focus to an item to be selected from among a plurality of items listed in the vertical direction. FIG. 10 illustrates a case where the user utters "down" in order to move the focus, and then utters "stop" at a timing when the focus has moved to a desired item. In FIG. 10, the user has uttered "stop" at the timing when the focus has moved to "item N", but the overshoot occurs by the degree of latency and the focus moves to "item P". By the technology of the present embodiment, however, the focus is corrected to "item N". Here, the item selected by correction is sometimes an item slightly shifted from the item desired by the user depending on the user's perception time and the like. Therefore, the output control unit 32 may display, on the display unit 11, an item in a predetermined range from among the corrected item so as to be selectable by number. In FIG. 10, at the time of focus correction, the selection numbers are presented by centering on "item N" focused at the input start timing. The information processing system 1 enables item selection by user's utterance of the selection number. In this case, in consideration of the user's perception time to, the output control unit 32 may perform number presentation such that the higher the moving velocity, the larger the number of past items are selectable. In the example of FIG. 10, when the movement velocity is high, the selection numbers are presented in the range of "item K" to "item O", and when the moving velocity is low, the selection numbers are presented in the range of "item L" to "item P".

Note that the output control unit 32 may present the selection number centered on the item that has been viewed at the input start timing observed by line-of-sight detection. In addition, in a case where the perception is delayed and a large number of items preceding to the item at the position Pt of the input start timing have been selected in the user's past number selection history, the output control unit 32 may present the selection number such that selection numbers will include a large number of the preceding items. In another case where the user makes a prediction and a large number of items succeeding to the item at the position Pt of the input start timing have been selected, the output control unit 32 may present the selection number such that selection numbers will include a large number of the succeeding items. Furthermore, the output control unit 32 may change the presentation item according to user's personal attribute information. For example, the output control unit 32 may present the selection number such that the older the user, the larger the number of past items to be presented.

The assignment of the selection numbers is not limited to the item selection. For example, a piece of content such as a picture may be divided and displayed on a screen, and a selection number may be assigned to each of the divided pieces of content being displayed.

2-3. Flow of Processing According to Embodiment

Next, a flow of various types of processing executed in the command processing by the information processing system 1 according to the embodiment will be described. FIG. 11 is a flowchart illustrating state storage processing according to the embodiment of the present disclosure. This state storage processing is executed at the timing when the input start timing has been input from the detection unit 30.

The command processing unit 31 determines whether the update flag fu is True (step S10). In a case where the update flag fu is not True (step S10: No), the command processing unit 31 ends the measurement of a time t1 being the time interval from the previous utterance (step S11). The command processing unit 31 determines whether the time t1 is a specified time th or less (step S12). In a case where the time t1 is the specified time th or less (step S12: Yes), the command processing unit 31 ends the processing.

In contrast, in a case where the time t1 is not the specified time th or less (step S12: No), the command processing unit 31 sets the update flag fu to True (step S13). The command processing unit 31 then stores the time Tb of the input start timing or the state Tb of the operation target at the input start timing (step S14), and ends the processing.

In contrast, when the update flag fu is True (step S10: Yes), the processing proceeds to step S14 described above, the time Tb of the input start timing or the state Tb of the operation target at the time is stored (step S14) and the processing is ended.

By this state storage processing, the state of the operation target is stored when the utterance intent Intent of the previous utterance is other than the OOD or when the time t1 from the previous utterance is longer than the specified time th.

Figure 12:
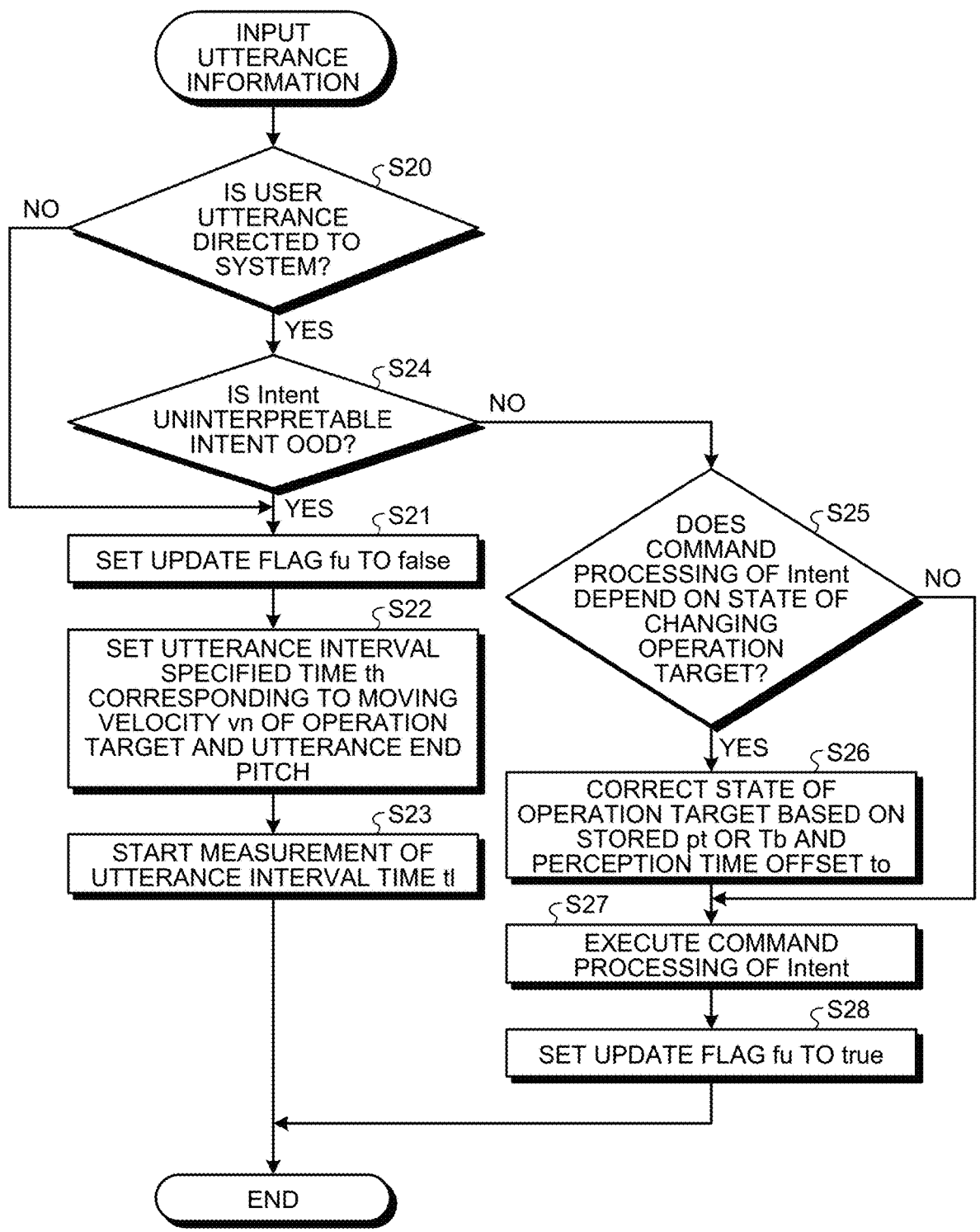
FIG. 12 is a flowchart describing command processing according to the embodiment of the present disclosure.

FIG. 12 is a flowchart illustrating command processing according to an embodiment of the present disclosure. This command processing is executed at a timing when the utterance intent information has been input from the semantic comprehension unit 34.

The command processing unit 31 determines whether the user's utterance is directed to the information processing system 1 (step S20). In a case where the user's utterance is not directed to the information processing system 1 (step S20: No), the command processing unit 31 sets the update flag fu to False (step S21). The command processing unit 31 sets the specified time th according to a velocity vn of the operation target, the pitch of the utterance, and the like (step S22). After initializing the time t1 to 0, the command processing unit 31 starts measuring the time t1 (step S23).

In contrast, in a case where the user's utterance is directed to the information processing system 1 (step S20: Yes), the command processing unit 31 determines whether the utterance intent Intent indicated by the utterance intent information is OOD (step S24). In a case where the utterance intent Intent is OOD (step S24: Yes), the processing proceeds to step S21 described above.

In contrast, in a case where the utterance intent Intent is not OOD (step S24: No), the command processing unit 31 determines whether the processing of the command of the utterance intent Intent depends on the state of the operation target that changes (step S25). For example, in a case where the operation target has made a temporal change and the state of the operation target varies depending on the timing of executing the command, it is determined that the processing of the command depends on the state of the operation target that changes. For example, when the stop command is executed while the volume is being increased, the volume varies depending on the timing of executing the stop command. Therefore, it is determined that, regarding the stop command when the volume is being increased, the processing of the command depends on the state of the operation target that changes. In contrast, for example, regarding the stop command that stops the playback, the playback of the content is stopped without depending on the volume. Accordingly, it is determined that the processing of the command does not depend on the state of the operation target that changes.

In a case where the processing of the command of the utterance intent Intent depends on the state of the operation target that changes (step S25: Yes), the command processing unit 31 corrects the state of the operation target based on the stored time Tb or the state Tb of the operation target at the time and based on the user's perception time to (step S26). Subsequently, the command processing unit 31 performs the processing of the command based on the state of the operation target (step S27). The command processing unit 31 sets update flag fu to True (step S28), and ends the processing.

In contrast, in a case where the processing of the command of the utterance intent Intent does not depend on the state of the operation target that changes (step S25: No), the processing proceeds to step S27 described above.

3. Modification

The above-described embodiment is an example, and various modifications and applications are possible. The following is a case, as a modification, where image search in a video is performed using the information processing system 1 according to the present embodiment.

FIG. 13 is a diagram describing the modification of the present disclosure. FIG. 13 illustrates a sequence of performing, by using a command by voice, an operation related to playback of video content captured by a monitoring camera. FIG. 13 illustrates individual periods, namely, periods of user's utterance, utterance section detection, voice recognition, and semantic comprehension. In addition, pieces of video content displayed by playback are illustrated in the lower part of FIG. 13, and a seek bar 81 indicating a playback position of the video is illustrated in the lower part of each video content. FIG. 13 illustrates a case where, during fast-forward playback of pieces of video content captured by a monitoring camera, a user finds a person to be focused on, utters "Oh", and then utters "Zoom in on the person with a black cap".

The utterance intent Intent "Oh" is OOD and is handled as a filler. When the time t1 until the utterance start timing of "Zoom in on the person with a black cap" after the utterance of "Oh" is a specified time th or less, the command processing unit 31 performs processing of a command based on the state of the operation target at the timing of the start of occurrence of the filler. For example, the command processing unit 31 causes the image recognition unit 35 to perform image search for a specifying target designated by a command throughout the frames of a certain period before a frame Pt played at the filler input start timing. For example, the command processing unit 31 regards the video of a certain period ending at the frame Pt of the input start timing as a time series of discrete frames, and performs image search on each of frames by going back in time starting from the frame Pt. The image recognition unit 35 performs image search for a "person with a black cap". The command processing unit 31 performs command processing on the frame in which the specifying target is first found. For example, in a case where a frame including "a person with a black cap" is specified by image search, the command processing unit 31 enlarges the region of the "person with a black cap" within the specified frame. The output control unit 32 outputs a frame obtained by enlarging the region of the "person with a black cap" to the display unit 11. In FIG. 13, a "person with a black cap" is zoomed in and displayed as a result of the command processing.

The command processing unit 31 may perform loop playback and display of the video for a certain period from the frame Pt at the input start timing. The output control unit 32 repeatedly outputs the video for a certain period starting from the frame Pt to the display unit 11. At this time, the command processing unit 31 may display a search tag for each of the frames to be played in loop playback. The search tag may be any tag by which each frame to be played in loop playback can be identified. Applicable examples of the search tag include a color or a number.

Figure 14A:
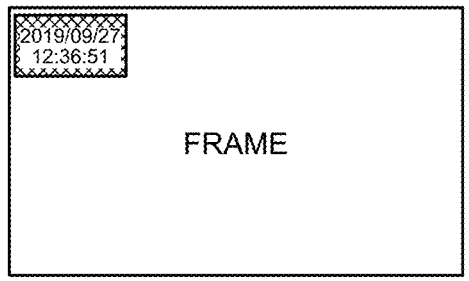
FIG. 14A is a view illustrating an example of a search tag of the present disclosure.
Figure 14B:
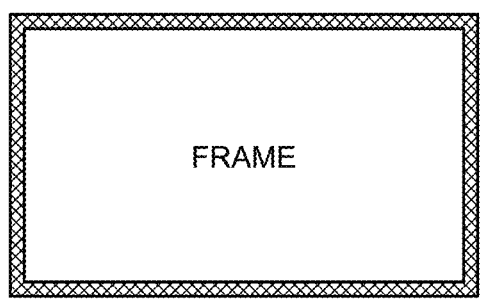
FIG. 14B is a view illustrating an example of the search tag of the present disclosure.
Figure 14C:
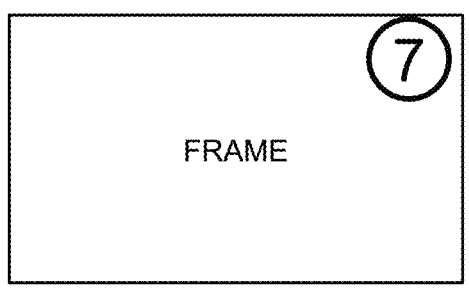
FIG. 14C is a view illustrating an example of the search tag of the present disclosure.

FIGS. 14A to 14C are views illustrating examples of a search tag of the present disclosure. In FIG. 14A, the date and time indicating the playback position is combined and displayed as a search tag on the background of each frame. In FIG. 14B, in a screen that displays a frame, the color of an edge of the frame is different for individual frames, and each color of the edge of the screen is displayed as a search tag. In FIG. 14C, different numbers are given for each frame, and each number is displayed as a search tag.

When a search tag is designated by the user, the command processing unit 31 searches for and displays a frame corresponding to the designated search tag. For example, the output control unit 32 displays the background color of the frame using a color circulating at a constant cycle. In response to the utterance "go back to red", the command processing unit 31 searches for and displays a frame displayed in red before the frame Pt. In addition, the output control unit 32 displays a number circulating every 1 second on a frame to be played in loop playback, for example. In response to the utterance "go back to 8", the command processing unit 31 searches for and displays a frame displaying the number "8" before the frame Pt.

Figure 15:
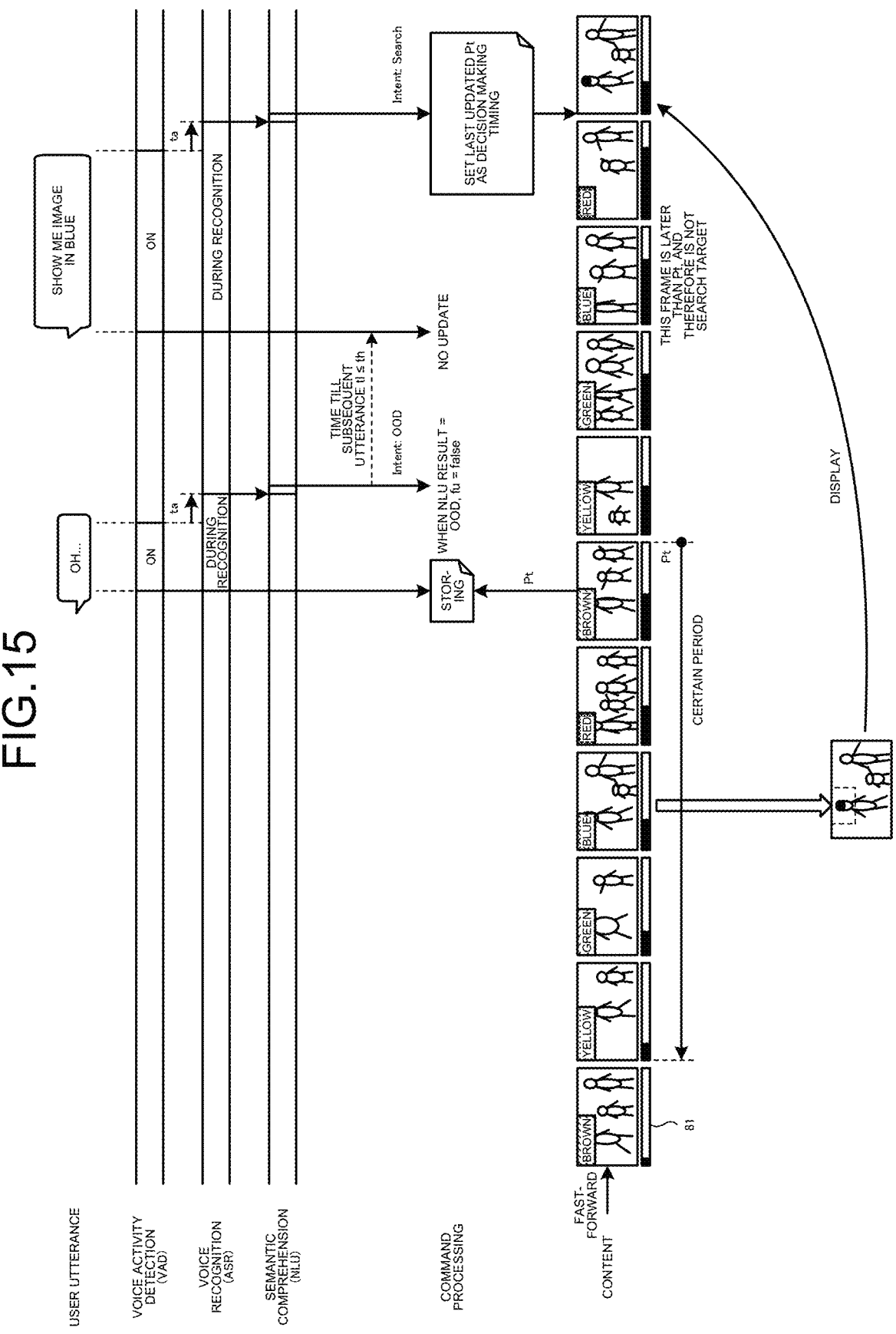
FIG. 15 is a diagram describing a modification of the present disclosure.

FIG. 15 is a diagram describing a modification of the present disclosure. FIG. 15 illustrates a sequence in a case where a video of a certain period before the frame Pt corresponding to the input start timing is played in loop playback in FIG. 13. In FIG. 15, in individual frames within a certain period before the frame Pt, a part of the background of each of the frames is displayed in colors circulating in the order of brown, yellow, green, blue, and red, being combined and displayed as a search tag. The user can designate the frame by uttering the color of the combined background. When a certain color has been designated by the utterance, the command processing unit 31 causes the output control unit 32 to display a frame on which the designated color has been combined. FIG. 15 is a case where "blue" is designated by the user and a frame to which a "blue" background has been combined is displayed.

Furthermore, an operation by voice recognition sometimes needs an activation word referred to as a wake up word (WUW) for activating voice recognition. In a case where an utterance is made before the wake up word of voice recognition, the following correction may be performed. For example, in a case where a time t1 from the end of the utterance (the timing of VAD=OFF) performed before the wake up word to the start of the wake up word is a specified time th or less, the command processing unit 31 may perform processing of a command based on a state Pt of the operation target at the input start timing of the previous utterance. For example, in a case where "Oh, I want to watch it again, <WUW> Rewind the video." is uttered, the command processing unit 31 turns the playback position of the input start timing of the first utterance "Oh" before WUW. Furthermore, for example, even in a case where the user has forgotten the utterance of WUW such as "rewind, <WUW> rewind" and has rephrased the utterance, the command processing unit 31 returns to the playback position at the input start timing of the first utterance "Rewind" before WUW.

Furthermore, for example, in operating a discrete operation target such as item selection, the output control unit 32 may present a sound effect/vibration to make a break obvious when moving to the next item at the time of movement. Furthermore, the output control unit 32 may output a question such as "Item N?" by voice synthesis referred to as Text to Speech (TTS) using the item focused on the input start timing as a leading candidate of selection. Furthermore, in response to the utterance of "rewind to the previous point" during reading out the text, the output control unit 32 may return to the beginning of the phrase or sentence read out at the input start timing. For example, the text to be read is analyzed by natural language analysis to extract a break in a phrase or sentence. The output control unit 32 returns to the last break of the phrase or sentence at the input start timing and reads out the text.

Furthermore, the technology of the present disclosure may be applied to a car navigation system. For example, when "Oh, I should have turned the previous corner, <WUW> turn left at that corner" is uttered, the car navigation system may guide the route to the left turn point immediately before the input start timing of the first utterance.

Furthermore, regarding an operation target that would greatly damage the user due to the overshoot of the latency of the utterance, it is allowable to place a pause toward a change in the operation target at the utterance input start timing. For example, the command processing unit 31 suspends the temporal change of the state of the operation target in the state of the input start timing. In a case where the command that has undergone voice recognition is a stop instruction, the command processing unit may stop the operation target, and in a case where the command is other than the stop instruction, the command processing unit 31 may cancel the suspension. For example, in a case where the volume is a certain value or more in the volume operation, the command processing unit 31 controls the output control unit 32 so as to pause the increase in the volume at the input start timing of the utterance. In a case where the utterance intent Intent after the utterance is a stop instruction, the command processing unit 31 controls the output control unit 32 to continuously stop the increase in volume. In a case where the utterance intent Intent is other than the stop instruction, the command processing unit 31 controls the output control unit 32 to cancel the pause and increase the volume.

Furthermore, in a case where the target is estimated from the timing such as "stop", the command processing unit 31 may perform fine adjustment of the display position such that all the estimated targets can be viewed. During the scrolling, the command processing unit 31 may perform control such that the scroll speed decreases when the user starts speaking, not limited to the word "stop".

Figure 16A:
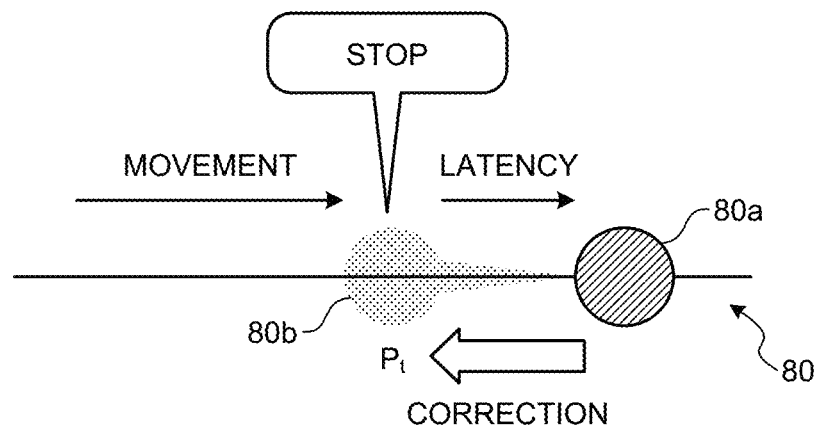
FIG. 16A is a diagram describing an example of display of an operation target of the present disclosure.
Figure 16B:
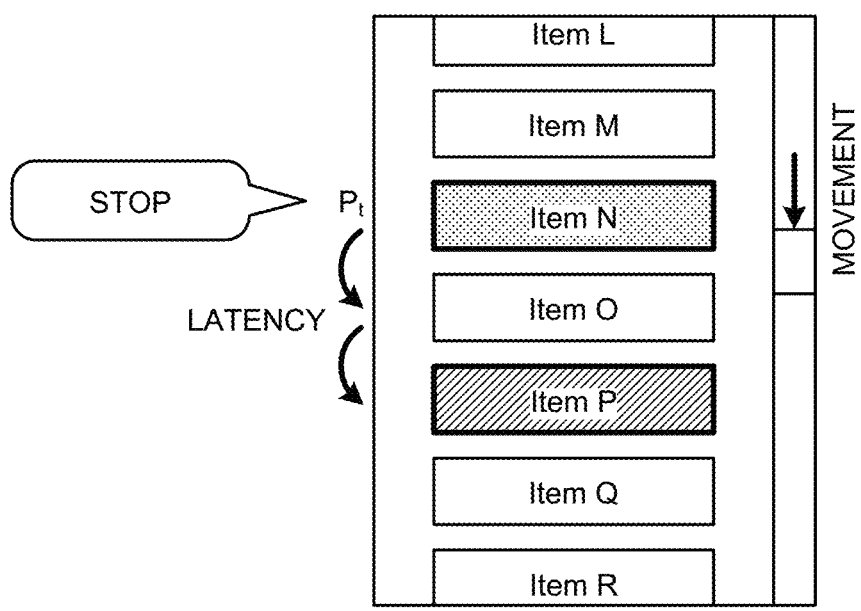
FIG. 16B is a diagram describing an example of display of an operation target of the present disclosure.

In addition, the display unit 11 may display the state of the operation target returned to the input start timing detected by the detection unit 30 together with the current state of the operation target that makes a temporal change. FIGS. 16A and 16B are diagrams describing an example of display of an operation target according to the present disclosure. The command processing unit 31 issues an output instruction to the output control unit 32 to display the state of the operation target at the input start timing detected by the detection unit 30. The output control unit 32 displays the state of the operation target at the input start timing as a corrected state together with the current state of the operation target. In the example of FIG. 16A, there are provided, on the volume indicator 80, a slider bar 80a displayed at the current position arrived by going too far by the degree of latency as well as a marker 80b displayed indicating a position Pt of the input start timing of the utterance "stop" as the corrected state. In the example of FIG. 16B, "item N" of the input start timing of the utterance of "stop" is displayed as the corrected state together with "item P" obtained by going too far by the degree of latency. The state after the correction may be set to disappear at the timing of completion of the correction or update of the position Pt.

Furthermore, although the above has described a case where the detection unit 30 detects the input start timing from the input voice data, detection of the input start timing is not limited to this case. The detection unit 30 may detect the input start timing from a result of image recognition performed by the image recognition unit 35. For example, the detection unit 30 may detect the timing at which the facial expression of the user changes based on the result of image recognition performed by the image recognition unit 35, as the input start timing. Furthermore, for example, in the item selection as illustrated in FIG. 9C, the detection unit 30 may detect, based on the line-of-sight detection result, the timing at which the gaze point of the user follows the scrolling of a specific item during the scroll movement, as the input start timing. In addition, after the stop, the command processing unit 31 may determine how far the operation target should be returned according to the position/movement of the line of sight of the user.

Although the present embodiment has described an exemplary case where voice is used as a gesture, recognition processing is performed on a command input by voice, and the recognized command is processed, the processing is not limited this case. The technology of the present disclosure may be applied in a case where a gesture is a physical motion such as body or hand gesture, recognition processing of a command input by the physical motion is performed, and the recognized command is processed. Even in a case where a command is recognized from a physical motion, a delay occurs in the start of processing by the recognition processing, and thus the technology of the present disclosure is effective.

4. Effects of Embodiment

As described above, the information processing apparatus 10 according to the embodiment includes the detection unit 30 and the command processing unit 31. The detection unit 30 detects an input start timing of a command by a gesture on an operation target with a temporal change. The command processing unit 31 performs processing of a command recognized from the gesture based on the state of the operation target at the input start timing detected by the detection unit 30. With this configuration, the information processing apparatus 10 can perform the processing of the command at an intended timing for the operation target.

In addition, a command is input by voice. The detection unit 30 detects an input start timing of the command by voice. With this configuration, the information processing apparatus 10 can perform the processing of the command at the timing when the user inputs a command to the operation target by voice.

In addition, the command processing unit 31 stores the time of the input start timing detected by the detection unit 30 or the state of the operation target at the time. The command processing unit 31 performs the processing of the command on the state of the operation target that has gone back to the state at the stored time, or on the stored state of the operation target. With this configuration, the information processing apparatus 10 can perform the processing of the command on the state of the operation target at the input start timing.

In addition, in a case where a command by voice is input within a predetermined specified time th after the filler utterance, the command processing unit 31 performs the processing of the command in a state of the operation target returned to the state of the input start timing of the filler utterance. With this configuration, the information processing apparatus 10 can perform the processing of the command at the timing intended by the user even in a case where the filler utters immediately before the command by the user.

Furthermore, the information processing apparatus 10 further includes the display unit 11, the image capture unit 12, and the image recognition unit 35. The display unit 11 displays the operation target. The image capture unit 12 captures an image of the user who inputs the command. The image recognition unit 35 detects at least one of the direction of the face or the line of sight of the user from the image captured by the image capture unit 12. The command processing unit 31 determines whether the user is viewing the display unit 11 from at least one of the direction of the face and the line of sight detected by the image recognition unit 35 when the command is input. In a case where the user is viewing the display unit 11, the command processing unit 31 performs processing of a command based on the state of the operation target at the input start timing detected by the detection unit 30. With this configuration, the information processing apparatus 10 can discriminate whether the command is directed to the operation target and perform the processing of the command.

Moreover, the command processing unit 31 performs processing of the command based on the state of the operation target at the timing changed from the input start timing detected by the detection unit 30 by a length of the perception time corresponding to the attribute of the user who inputs the command. With this configuration, the information processing apparatus 10 can perform the processing of the command at the timing intended by the user even when there is a perception time until the user recognizes that it is the operation timing and inputs the command.

In addition, the display unit 11 displays the state of the operation target returned to the input start timing detected by the detection unit 30 together with the current state of the operation target that makes a temporal change. With this configuration, the information processing apparatus 10 can grasp the state of the operation target at the timing of command input together with the current state of the operation target.

In addition, the operation target is an operation in which an item to be selected sequentially transitions from among a plurality of items. The command processing unit 31 displays, on the display unit 11, an item whose transition is within a predetermined range beginning with an item to be selected at the timing detected by the detection unit 30 so as to be selectable by number. With this configuration, even when the item to be selected at the timing detected by the detection unit 30 slightly deviates from the item desired by the user, the information processing apparatus 10 can display the desired item such that the user can designate the desired item by the number.

Furthermore, the detection unit 30 detects the input start timing from the recognition result of the image captured by the image capture unit 12. With this configuration, the information processing apparatus 10 can perform processing of a command at the timing intended by the user.

In addition, the command processing unit 31 suspends a change of the state of the operation target, the change being a change accompanying a temporal change, in the state of the input start timing detected by the detection unit 30. The command processing unit 31 stops the operation target in a case where the command recognized from the gesture is the stop instruction, and cancels the suspension in a case where the command is other than the stop instruction. With this configuration, the information processing apparatus 10 can suppress occurrence of overshoot in the operation target when stopping the operation target.

In addition, the command processing unit 31 performs loop display of the temporal change of the operation target during a certain period from the input start timing detected by the detection unit 30. With this configuration, the information processing apparatus 10 can display the state of the operation target for a certain period from the input start timing so that the user can easily confirm the state.

In addition, the command processing unit 31 displays a search tag by which the state of the operation target during a certain period can be identified. With this configuration, the information processing apparatus 10 can display the state of the operation target during a certain period such that the user can designate the state with the search tag.

Furthermore, in a case where the time from the input start timing of the utterance made before the wake up word of the voice recognition to the utterance of the wake up word is a specified time or less, the command processing unit 31 performs processing of a command based on the state of the operation target at the input start timing of the utterance made before the wake up word. With this configuration, even in a case where the wake up word is uttered after the utterance of the command, the information processing apparatus 10 can perform the processing of the command at the timing of utterance of the command.

The preferred embodiments of the present disclosure have been described in detail above with reference to the accompanying drawings. However, the present technology is not limited to such examples. It will be apparent to those skilled in the art of the present disclosure that various modifications and alterations can be conceived within the scope of the technical idea described in the claims and naturally fall within the technical scope of the present disclosure.

In addition, all or part of each processing described in the present embodiment may be implemented by causing a processor such as a CPU included in both the information processing apparatus 10 and the server device 20 to execute a program corresponding to each processing. For example, a program corresponding to each processing in the above description may be stored in memory, and the program may be read from the memory and executed by the processor. Furthermore, the program may be stored in a program server connected to at least one of the information processing apparatus 10 or the server device 20 via an arbitrary network, and downloaded to and executed on at least one of the information processing apparatus 10 or the server device 20. Furthermore, the program may be stored in a recording medium readable by either the information processing apparatus 10 or the server device 20, read from the recording medium so as to be executed. The recording medium includes, for example, a portable storage medium such as a memory card, a USB drive, an SD card, a flexible disk, a magneto-optical disk, a CD-ROM, a DVD, and a Blu-ray (registered trademark) disk. In addition, the program may use a data processing method described in an arbitrary language or an arbitrary description method, and the program may be written in any format, such as a source code or a binary code. In addition, the program is not necessarily limited to a single program, and includes a program configured in distributed programs as a plurality of modules or a plurality of libraries, and a program that achieves its own function in cooperation with a separate program represented by an OS.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

Furthermore, the disclosed technology can also adopt the following configurations.

(1)
An information processing apparatus including:
a detection unit that detects an input start timing of a command by a gesture on an operation target with a temporal change; and
a command processing unit that performs processing of a command recognized from the gesture based on a state of the operation target at the input start timing detected by the detection unit.

(2)
The information processing apparatus according to (1),
wherein the command is input by voice, and
the detection unit detects an input start timing of the command by voice.

(3)
The information processing apparatus according to (1) or (2),
wherein the command processing unit stores a time of the input start timing detected by the detection unit or the state of the operation target at the time, and performs processing of the command on the state of the operation target that has gone back to the state at the stored time, or on the stored state of the operation target.

(4)
The information processing apparatus according to (2),
wherein, in a case where a command by voice is input within a predetermined specified time after a filler utterance, the command processing unit performs processing of the command in a state of the operation target returned to the state of the input start timing of the filler utterance.

(5)
The information processing apparatus according to any one of (1) to (4), further including:
a display unit that displays the operation target;
an image capture unit that captures an image of a user who inputs a command; and
an image recognition unit that detects at least one of a direction of a face or line of sight of the user from the image captured by the image capture unit,
wherein the command processing unit determines whether the user is viewing the display unit based on at least one of the direction of the face or the line of sight detected by the image recognition unit when a command is input, and in a case where the user is viewing the display unit, the command processing unit performs processing of the command based on the state of the operation target at the input start timing detected by the detection unit.

(6)
The information processing apparatus according to any one of (1) to (5),
wherein the command processing unit performs processing of the command based on a state of the operation target at a timing changed from the input start timing detected by the detection unit by a length of a perception time corresponding to an attribute of the user who inputs the command.

(7)
The information processing apparatus according to (5),
wherein the display unit displays a state of the operation target returned to the input start timing detected by the detection unit together with a current state of the operation target with a temporal change.

(8)
The information processing apparatus according to (5),
wherein the operation target is an operation in which an item to be selected sequentially transitions from among a plurality of items, and
the command processing unit displays, on the display unit, an item whose transition is within a predetermined range beginning with an item to be selected at the timing detected by the detection unit so as to be selectable by number.

(9)
The information processing apparatus according to (5),
wherein the detection unit detects the input start timing from a recognition result of the image captured by the image capture unit.

(10)
The information processing apparatus according to any one of (1) to (9),
wherein the command processing unit suspends a change of the state of the operation target, the change being a change accompanying a temporal change, in the state of the input start timing detected by the detection unit, stops the operation target when a command recognized from the gesture is a stop instruction, and cancels the suspension when the command is other than the stop instruction.

(11)

The information processing apparatus according to any one of (1) to (9),
wherein the command processing unit performs loop display of a temporal change of the operation target during a certain period from the input start timing detected by the detection unit.

(12)

The information processing apparatus according to wherein the command processing unit displays a search tag by which the state of the operation target during the certain period can be identified.

(13)

The information processing apparatus according to (2),
wherein, when a time from the input start timing of the utterance made before a wake up word of voice recognition to the utterance of the wake up word is a specified time or less, the command processing unit performs processing of the command based on the state of the operation target at the input start timing of the utterance made before the wake up word.

(14)

A command processing method to be executed by a computer, the method including:
detecting an input start timing of starting input of a command by a gesture on an operation target with a temporal change; and
executing processing of a command recognized from the gesture based on the state of the operation target at the detected input start timing.

REFERENCE SIGNS LIST

1 INFORMATION PROCESSING SYSTEM
10 INFORMATION PROCESSING APPARATUS
11 DISPLAY UNIT
12 IMAGE CAPTURE UNIT
13 VOICE OUTPUT UNIT
14 VOICE INPUT UNIT
15 STORAGE UNIT
16 COMMUNICATION UNIT
17 CONTROL UNIT
20 SERVER DEVICE
21 COMMUNICATION UNIT
22 STORAGE UNIT
23 CONTROL UNIT
30 DETECTION UNIT
31 COMMAND PROCESSING UNIT
32 OUTPUT CONTROL UNIT
33 VOICE RECOGNITION UNIT
34 SEMANTIC COMPREHENSION UNIT
35 IMAGE RECOGNITION UNIT
40 USER DATA
41 CONTENT DATA

The invention claimed is:

1. An information processing apparatus comprising:
circuitry that
detects input of a first command;
performs processing according to the first command until a second command is detected;
detects a first time point at which input of the second command is started, the second command being input by a gesture on an operation target with a temporal change; and
performs, beginning at a second time point later than the first time point, processing of the second command recognized from the gesture based on a state of the operation target at the first time point, processing of the second command ending the processing according to the first command.

2. The information processing apparatus according to claim 1,
wherein the first command and the second command are input by voice, and
the first time point is a time point when utterance by the voice for the second command begins.

3. The information processing apparatus according to claim 1,
wherein circuitry stores the first time point or the state of the operation target at the first time point, and performs processing of the second command on the state of the operation target that has gone back to the state at the stored first time point, or on the stored state of the operation target.

4. The information processing apparatus according to claim 2,
wherein, in a case where the second command is input by the voice within a predetermined specified time after a filler utterance, the first time point corresponds to a time point when the filler utterance started.

5. The information processing apparatus according to claim 1, further including:
a display that displays the operation target, and
the circuitry further
captures an image of a user who inputs the second command; and
detects at least one of a direction of a face or line of sight of the user from the image captured, and
determines whether the user is viewing the display based on at least one of the direction of the face or the line of sight detected when the second command is input, and in a case where the user is viewing the display, the circuitry performs processing of the second command based on the state of the operation target at first time point.

6. The information processing apparatus according to claim 1,
wherein the circuitry performs processing of the second command based on a state of the operation target at a time point that differs from the first time point by a length of a perception time corresponding to an attribute of a user who inputs the second command.

7. The information processing apparatus according to claim 5,
wherein the display displays a state of the operation target returned to the first time point together with a current state of the operation target with a temporal change.

8. The information processing apparatus according to claim 5,
wherein the operation target is an operation in which an item to be selected sequentially transitions from among a plurality of items, and
the circuitry, on the display, displays an item whose transition is within a predetermined range beginning with an item to be selected at a timing detected to be selectable by number.

9. The information processing apparatus according to claim 5,
wherein the circuitry detects the first time point from a recognition result of the image captured.

10. The information processing apparatus according to claim 1,
wherein the circuitry suspends a change of the state of the operation target, the change being a change accompanying a temporal change, in the state of the first time point, stops the operation target when the second command recognized from the gesture is a stop instruction, and cancels the suspension when the second command is other than the stop instruction.

11. The information processing apparatus according to claim 1,
wherein the circuitry performs loop display of a temporal change of the operation target during a certain period from the first time point.

12. The information processing apparatus according to claim 11,
wherein the circuitry displays a search tag by which the state of the operation target during the certain period can be identified.

13. The information processing apparatus according to claim 2,
wherein, when a time from the first time point of the utterance made before a wake up word of voice recognition to the utterance of the wake up word is a specified time or less, the circuitry performs processing of the second command based on the state of the operation target at the first time point of the utterance made before the wake up word.

14. A command processing method to be executed by a computer, the method comprising:
detecting input of a first command;
performing processing according to the first command until a second command is detected;
detecting a first time point at which input of the second command is started, the second command being input by a gesture on an operation target with a temporal change; and
executing, beginning at a second time point later than the first time point, processing of the second command recognized from the gesture based on a state of the operation target at the first time point, processing of the second command ending the processing according to the first command.

15. A non-transitory computer-readable medium encoded with computer-readable instructions that, when executed by a computer, cause the computer to perform a method comprising:
detecting input of a first command;
performing processing according to the first command until a second command is detected;
detecting a first time point at which input of the second command is started, the second command being input by a gesture on an operation target with a temporal change; and
executing, beginning at a second time point later than the first time point, processing of the second command recognized from the gesture based on a state of the operation target at the first time point, processing of the second command ending the processing according to the first command.

16. The information processing apparatus according to claim 1, wherein the processing of the first command and the second command includes volume adjustment.

17. The information processing apparatus according to claim 5, wherein the circuitry periodically captures images of the user.

18. The information processing apparatus according to claim 2, wherein the circuitry detects the first time point when a volume of the voice reaches a predetermined level.

19. The information processing apparatus according to claim 18, wherein the volume of the voice is determined as a root mean square (RMS) volume.

* * * * *